US010417837B2

(12) United States Patent
Stanek et al.

(10) Patent No.: US 10,417,837 B2
(45) Date of Patent: Sep. 17, 2019

(54) ARRANGEMENTS FOR COLLECTING DIAGNOSTIC INFORMATION REGARDING VIBRATIONS OF WHEEL-TIRE ASSEMBLY AND DRIVE-LINE COMPONENTS OF A WHEELED VEHICLE

(71) Applicant: FORD GLOBAL TECHNOLOGIES, LLC, Dearborn, MI (US)

(72) Inventors: Joseph F. Stanek, Northville, MI (US); Jianbo Lu, Northville, MI (US); Timothy Mark Feldkamp, Ann Arbor, MI (US); Ryan Lee Baker, Dearborn Heights, MI (US); Fling Finn Tseng, Ann Arbor, MI (US); Kelly Trost, Plymouth, MI (US); David Scott Rohweder, Troy, MI (US); Daniel Haakenson, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 78 days.

(21) Appl. No.: 15/272,865

(22) Filed: Sep. 22, 2016

(65) Prior Publication Data

US 2018/0082492 A1 Mar. 22, 2018

(51) Int. Cl.
*G07C 5/00* (2006.01)
*G05B 19/042* (2006.01)
*G07C 5/08* (2006.01)

(52) U.S. Cl.
CPC .......... *G07C 5/006* (2013.01); *G05B 19/042* (2013.01); *G07C 5/085* (2013.01); *G07C 5/0808* (2013.01); *G05B 2219/2637* (2013.01); *G05B 2219/37351* (2013.01)

(58) Field of Classification Search
CPC ...... G07C 5/006; G07C 5/0808; G07C 5/085; G05B 23/00
See application file for complete search history.

(56) References Cited

U.S. PATENT DOCUMENTS

| 6,385,553 | B1* | 5/2002 | Naito .................... B60C 23/061 |
| | | | 702/138 |
| 6,522,968 | B1* | 2/2003 | Ito ........................... B60T 8/172 |
| | | | 180/197 |
| 9,133,774 | B2* | 9/2015 | Oikawa ................. B60W 30/20 |
| 2003/0006890 | A1 | 1/2003 | Magiawala et al. |
| 2003/0006893 | A1 | 1/2003 | Dunbridge et al. |

(Continued)

OTHER PUBLICATIONS

J. Lu, et al., "Real-time Tire Imbalance Detection Using ABS Wheel Speed Sensors", Apr. 12, 2011.

*Primary Examiner* — Frederick M Brushaber
(74) *Attorney, Agent, or Firm* — Jones Robb, PLLC; Raymond Coppiellie

(57) ABSTRACT

A method for identifying vehicle vibration includes receiving signals indicative of a vehicle vibration from one or more vehicle sensors while the vehicle is in operation. The method also includes determining a magnitude of the vehicle vibration at one or more target frequency bands. The method additionally includes determining whether the vehicle vibration is associated with one or more wheels of the vehicle based on the magnitude of the vehicle vibration at the one or more target frequency bands. The method further includes generating a diagnostic recommendation when the vehicle vibration is associated with the one or more wheels of the vehicle.

29 Claims, 11 Drawing Sheets

(56) References Cited

U.S. PATENT DOCUMENTS

| | | | |
|---|---|---|---|
| 2003/0200051 A1* | 10/2003 | Nakashima | B60C 23/061 702/140 |
| 2004/0172181 A1 | 9/2004 | Lu et al. | |
| 2006/0267750 A1 | 11/2006 | Lu et al. | |
| 2007/0107971 A1* | 5/2007 | Nagao | B60K 5/12 180/300 |
| 2008/0234964 A1* | 9/2008 | Miyasaka | G01H 1/003 702/113 |
| 2009/0139327 A1 | 6/2009 | Dagh et al. | |
| 2009/0224502 A1* | 9/2009 | Yamawaki | B60G 17/06 280/124.108 |
| 2009/0271075 A1 | 10/2009 | Hales et al. | |
| 2009/0282906 A1* | 11/2009 | Kawasaki | B60C 23/061 73/146.5 |
| 2010/0174437 A1 | 7/2010 | Benedict et al. | |
| 2010/0211249 A1 | 8/2010 | McClellan | |
| 2017/0166028 A1* | 6/2017 | Kubota | B60G 17/018 |

* cited by examiner

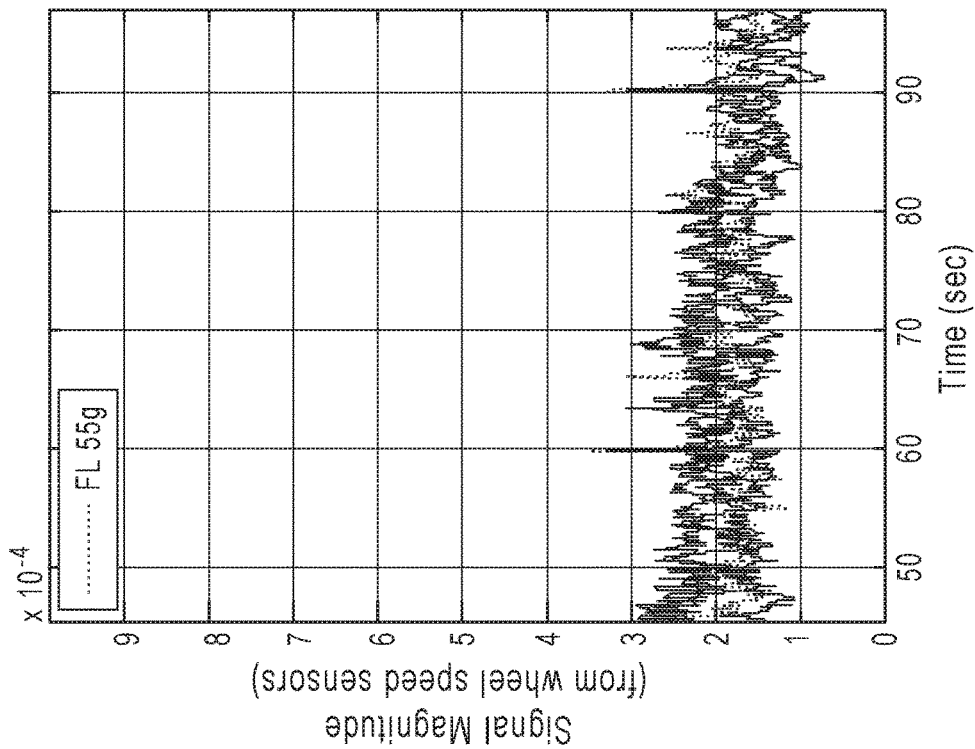
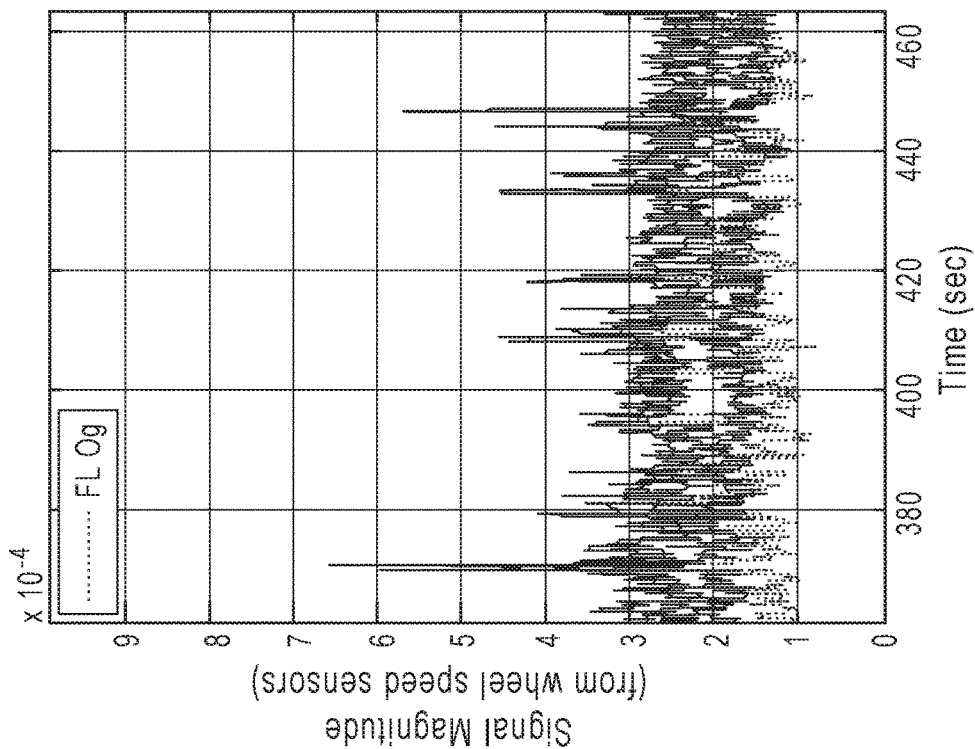
FIG. 8A
FIG. 8B

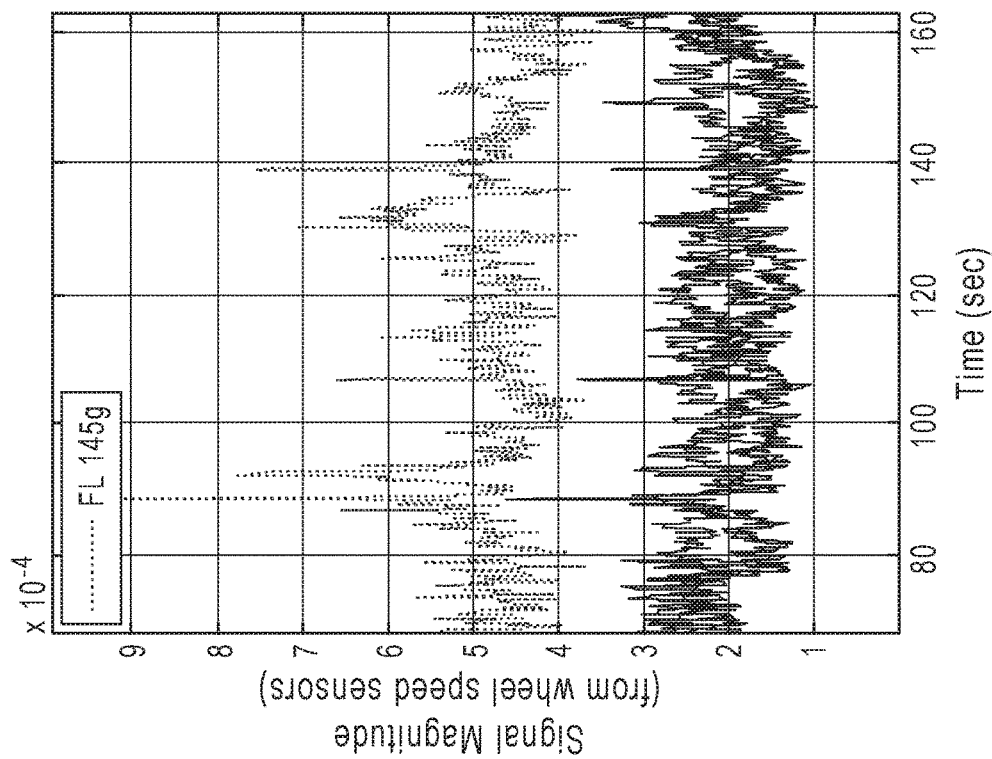
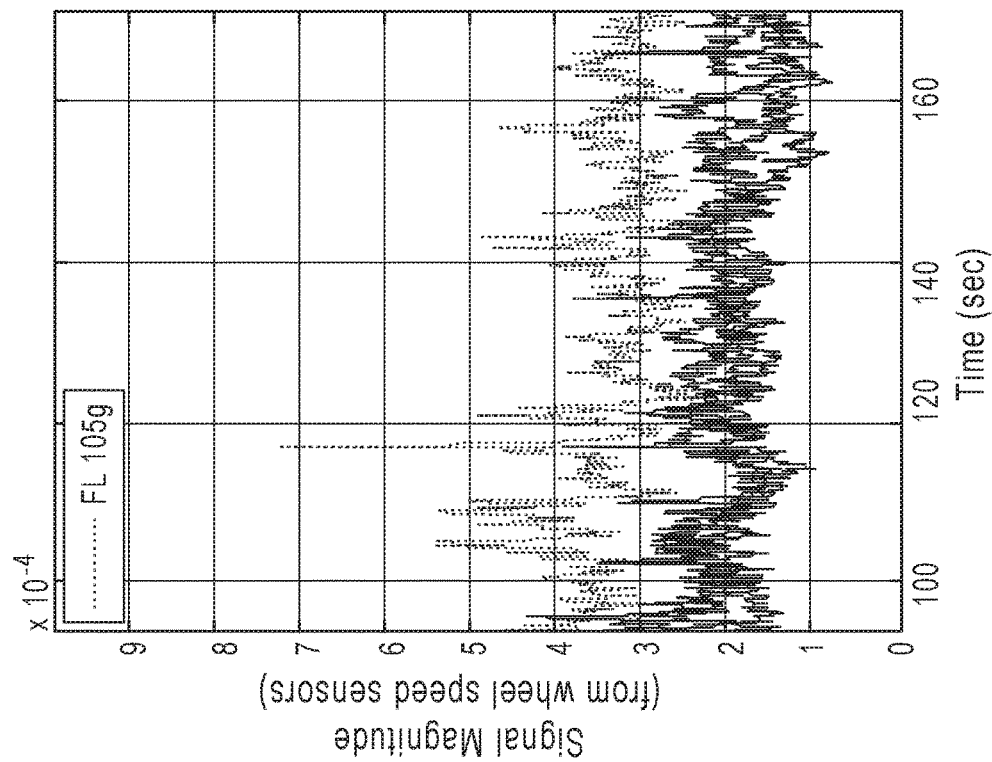

ARRANGEMENTS FOR COLLECTING DIAGNOSTIC INFORMATION REGARDING VIBRATIONS OF WHEEL-TIRE ASSEMBLY AND DRIVE-LINE COMPONENTS OF A WHEELED VEHICLE

TECHNICAL FIELD

The present teachings relate generally to systems and methods for identifying vehicle vibrations.

BACKGROUND

It is often difficult for service personnel to accurately reproduce, diagnose, and/or repair vibrations identified by vehicle owners during a service visit. Such vibrations may result from imbalance in the rotational components of chassis systems (e.g., tire and wheel assembly), vibrations from driveline systems, or vibrations which may be due to other external conditions such as, for example, road conditions. Standard fixes and service techniques, such as rebalancing tires, are often offered in response to complaints of vehicle vibrations. However, unless the service personnel can recreate the conditions causing a particular issue identified by the vehicle owner, such standard fixes are often unsuccessful.

It is desirable, from points of view of a vehicle owner and service technicians, for the service shop to be able to accurately diagnose and fix vibrations of chassis and driveline components of a motor vehicle, within a single service visit made by the vehicle owner. Further, it is desirable, from the points of view of the vehicle owner and the service shop that unnecessary (e.g., mis-diagnosed; guess-and-try) repairs be avoided so as to conserve vehicle owner and service shop resources (e.g., time and money).

What is needed is an on-board vibration diagnostic and prognostic system that can
robustly extract vibration signatures; and
record and profile the detected signatures in a time cadence to facilitate making a prognostic decision,
so that the service personnel can pinpoint the vibration source and to fix the vibration problem or recommend other repairs, in a single customer visit.

SUMMARY

In accordance with various exemplary embodiments of the present disclosure, a method for identifying a vehicle vibration comprises receiving signals indicative of a vehicle vibration from one or more vehicle sensors while the vehicle is in operation. The method also comprises determining a magnitude of the vehicle vibration at one or more target frequency bands. The method additionally comprises determining whether the vehicle vibration is associated with one or more wheels of the vehicle based on the magnitude of the vehicle vibration at the one or more target frequency bands. The method further comprises generating a diagnostic recommendation when the vehicle vibration is associated with the one or more wheels of the vehicle.

In accordance with various additional exemplary embodiments of the present disclosure, a method for identifying vehicle vibration comprises receiving signals indicative of a vehicle vibration from one or more vehicle sensors while the vehicle is in operation. The method also comprises determining whether a correlation exists between the presence of the vehicle vibration and vehicle operating conditions. The method additionally comprises, based on the correlation, determining whether the vehicle vibration is associated with external conditions or a condition of one or more vehicle components. The method further comprises generating a diagnostic recommendation when the vehicle vibration is associated with the condition of the one or more vehicle components.

In accordance with various additional exemplary embodiments of the present disclosure, a method for identifying vehicle vibration comprises receiving signals indicative of a vehicle vibration from one or more vehicle sensors while the vehicle is in operation. The method also comprises processing the signals to determine if a first order vehicle vibration is present. The method additionally comprises, if the first order vehicle vibration is determined to be present, generating a first diagnostic recommendation to resolve the first order vehicle vibration; and, if the first order vehicle vibration is determined to not be present, processing the signals to determine if a second order vehicle vibration is present. The method further comprises, if the second order vehicle vibration is determined to be present, generating a second diagnostic recommendation to resolve the second order vehicle vibration; and, if the second order vehicle vibration is determined to not be present, generating a third diagnostic recommendation to consider issues unrelated to the first and second order vehicle vibrations.

In accordance with various further exemplary embodiments of the present disclosure, a system for identifying vehicle vibration comprises a controller operatively associated with a plurality of vehicle sensors. The controller is configured to identify sensor feedback indicative of vehicle vibration. The controller is also configured to determine a frequency range associated with the vehicle vibration. The controller is further be configured to, based on the frequency range, make an initial correlation between a vehicle component or location and the vehicle vibration.

Additional objects and advantages will be set forth in part in the description which follows, and will be obvious from the description, or may be learned by practice of the present teachings. The objects and advantages of the teachings will be realized and attained via the elements and combinations particularly pointed out in the appended claims.

It is to be understood that both the foregoing general description and the following detailed description are examples and explanatory only, and are not restrictive of the claimed subject matter. The accompanying drawings, which are incorporated in and constitute part of this specification, illustrate example embodiments of the present teachings, and together with the description, serve to explain principles of the disclosure.

BRIEF DESCRIPTION OF THE DRAWINGS

At least some features and advantages of the present teachings will be apparent from the following detailed description of example embodiments consistent therewith, which description should be considered with reference to the accompanying drawings, wherein:

FIGS. 8A-8D (collectively FIG. 8) are plot diagrams of vibrations experienced at each of the four wheels in an exemplary arrangement, wherein the vibration experienced at each wheel is due to an imbalance of only one wheel.

Figure 1:
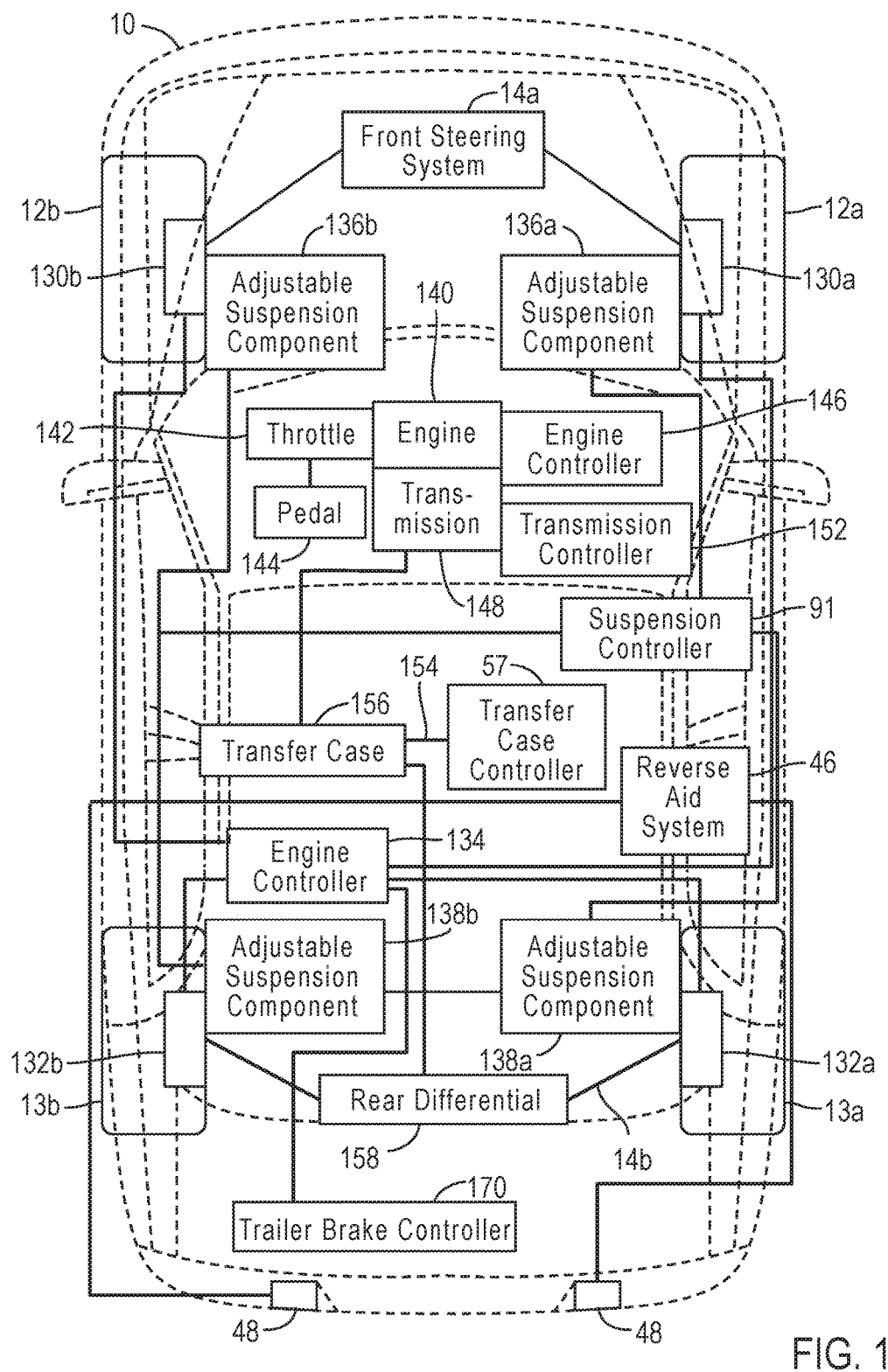
FIG. 1 is a high level block diagrammatic view of exemplary systems of an exemplary automotive vehicle in accordance with the present disclosure.

Although the following detailed description makes reference to illustrative embodiments, many alternatives, modifications, and variations thereof will be apparent to those skilled in the art. Accordingly, it is intended that the claimed subject matter be interpreted broadly.

DESCRIPTION OF EXAMPLE EMBODIMENTS

Reference will now be made in detail to various embodiments, examples of which are illustrated in the accompanying drawings. The various example embodiments are not intended to limit the disclosure. To the contrary, the disclosure is intended to cover alternatives, modifications, and equivalents.

As discussed above, in-service diagnostics often fail to assist a service shop in accurately determining and fixing complicated vehicle vibration problems besides simple tire imbalance. In the more complicated cases, the vibration picked by the driver might be due to the factors outside the tire/wheel assembly, e.g., a problem associated with the driveline components of a motor vehicle. In this case, balancing the tires would not only be a waste of resources, but may also reduce customer satisfaction. For example, a vehicle owner may arrive at a service shop (e.g., dealership) complaining of a vibration being experienced during real-time driving of the vehicle. A mechanic may take the vehicle for a test drive, but may be unable to re-create any vibration related to the driver's complaint. The mechanic may assume that one or more of the tires has a weight imbalance, whereupon the mechanic simply weight balances each of the four wheels and returns the vehicle to its owner. If the mechanic's assumption is incorrect, the decision to rebalance the wheel (i.e., the mechanic's "guess" at what will resolve the issue) represents a wasteful repair operation, and the frustrated vehicle owner might return for a second repair visit. Several rounds of "guessing" at the cause of the vibration and providing service based on such guesses may occur, leading to increased wastefulness and increasing frustration of the vehicle owner. Hence it is desirable to record the vibration signature experienced by the driver during specific driving conditions, which can be accessed by the service personnel, such that the above wasteful repairs are avoided, leading to improved customer satisfaction.

Even in the cases of balancing tires, the service personnel need to check all four tires for imbalance for a given vehicle. In reality, it is very rare that all 4 tires have a similar amount of imbalance. If there is a "digital signal" for each tire recording the vibration signature experienced by the vehicle during the normal use of the vehicle, the service personnel might be able to pinpoint the off balance tires instead of going through all the 4 tires.

For example, if a vehicle has a significant amount of imbalance on its RR (right-rear), which induces vibrations during various driving conditions (e.g., high driving with vehicle travel speed exceeding 60 mile per hour), then such a single wheel vibration might also induce vibrations on neighboring wheels RF (right-front) and LR (left-rear), e.g., due to the coupling between wheels through the axle, driveline, or vehicle body frame. The current practice of separately diagnosing each wheel may, therefore, result in setting false flags for the RF and LR wheels, even though a problem does not actually exist with these wheels. Setting diagnostic flags for these other wheels then results in the service shop performing unnecessary balancing of such wheels RF and LR. Hence individual vibration signatures might need to be considered with the vibration signatures of the other wheels together in order to avoid counting on the coupled vibrations as the signature of the true vibration.

As another example, each of the RR, RF, LR, and LF wheels may be properly balanced already, but there may still be vibration signatures showing up when the vehicle is driven extensively in a rough terrain such as an unpaved road segment. It is, therefore, also desirable to eliminate such road roughness-induced vibration signatures as a possible source or indication of a tire imbalance.

In contrast to these systems, a diagnostic system and method in accordance with the present teachings take a systematic approach. In particular, the present disclosure provides systems that may receive real-time data from several existing sensors, for example, the wheel speed sensor measurements from all wheels or the suspension height sensors for all the suspensions, during the normal operation of the vehicle. For example, a system and method in accordance with the present disclosure can differentiate between repetitive or persistent vibration signatures due to tire imbalance or due to drivetrain vibrations, which may be indicative of an ongoing vehicle issue, and temporary or short-term vibration signatures, which may be indicative of road conditions. In addition, the current disclosure presents teachings which may further parse the vibrations to locate the origin of the vibrations. For example, the system may be configured to distinguish between different frequencies of vibrations, wherein different frequencies of vibrations may be associated with different vehicle systems such as wheels, tires, driveshaft, engine combustions, engine cylinder imbalance, and/or engine mount problems.

The system and method of the present disclosure may rely on data from several systems and sensors. These systems and sensors may be conventional systems and sensors found on existing vehicles. The present disclosure further contemplates providing additional sensors as needed. Types of information that may be obtained from existing sensors and vehicle systems used in the methods of the present disclosure may include, for example, vehicle speed, ambient temperature, tire temperature, steering angle, brake force, engine speed, gear ratio, yaw rate, various accelerometers, vehicle travel speed, etc.

In accordance with one aspect of the present disclosure, a method, system and/or non-transient computer-readable medium-embedded programming, are configured to identify signal signatures indicative of driveline system vibration and/or tire/wheel imbalance and correlate the identified vibration signals and/or the tire/wheel imbalance to a vehicle speed.

In accordance with another aspect of the present disclosure, a method, system and/or non-transient computer-readable medium-embedded programming, as described herein, are configured to identify feedback indicative of driveline system vibration and/or tire/wheel imbalance and determine the frequencies of the vibrations. The method and system are further configured to identify an origin of the vibration based on the frequency of the vibration, wherein the origin of the vibration may include, for example, a vehicle wheel, driveline components, engine components, suspension components, etc. In accordance with this aspect of the present disclosure, the identification of the frequency of the vibration may also be used to rule out potential origins of the vibration, based on predetermined correspondence between vibration frequency and vehicle components/problems.

In accordance with another aspect of the present disclosure, a method, system and/or non-transient computer-readable medium-embedded programming, as described herein are configured to identify a vibration problem in the vehicle and the vehicle operating conditions under which the problem occurs. The method and system are further configured to determine whether the identified problem recurs under the same vehicle operating conditions. Depending upon the type of problem identified, the method and system may be further configured to determine whether the identified problem occurs under specific variations of the vehicle operating conditions.

In accordance with yet another aspect of the present disclosure, a method, system and/or non-transient computer-readable medium-embedded programming, as described herein, are configured to identify a vibration in the vehicle and determine whether the vibration is a transitory issue due to, for example, external conditions, such as road conditions (e.g., rough road) or ambient temperature (e.g., ice in tire), or is a repetitive issue due to vehicle conditions, such as for example, wheel imbalance or a warped rotor. As used in this application, "transient" conditions are vibration conditions induced by temporary road conditions like a rough road, i.e., the vibration condition does not show up repeatedly on smooth road conditions.

While the present disclosure is described using a four-wheeled motor vehicle as an example, practice of the present disclosure is not limited thereto, i.e., the present disclosure contemplates that the teachings may be practiced with two-wheeled motor vehicles, three-wheeled motor vehicles, etc.

Figure 2:
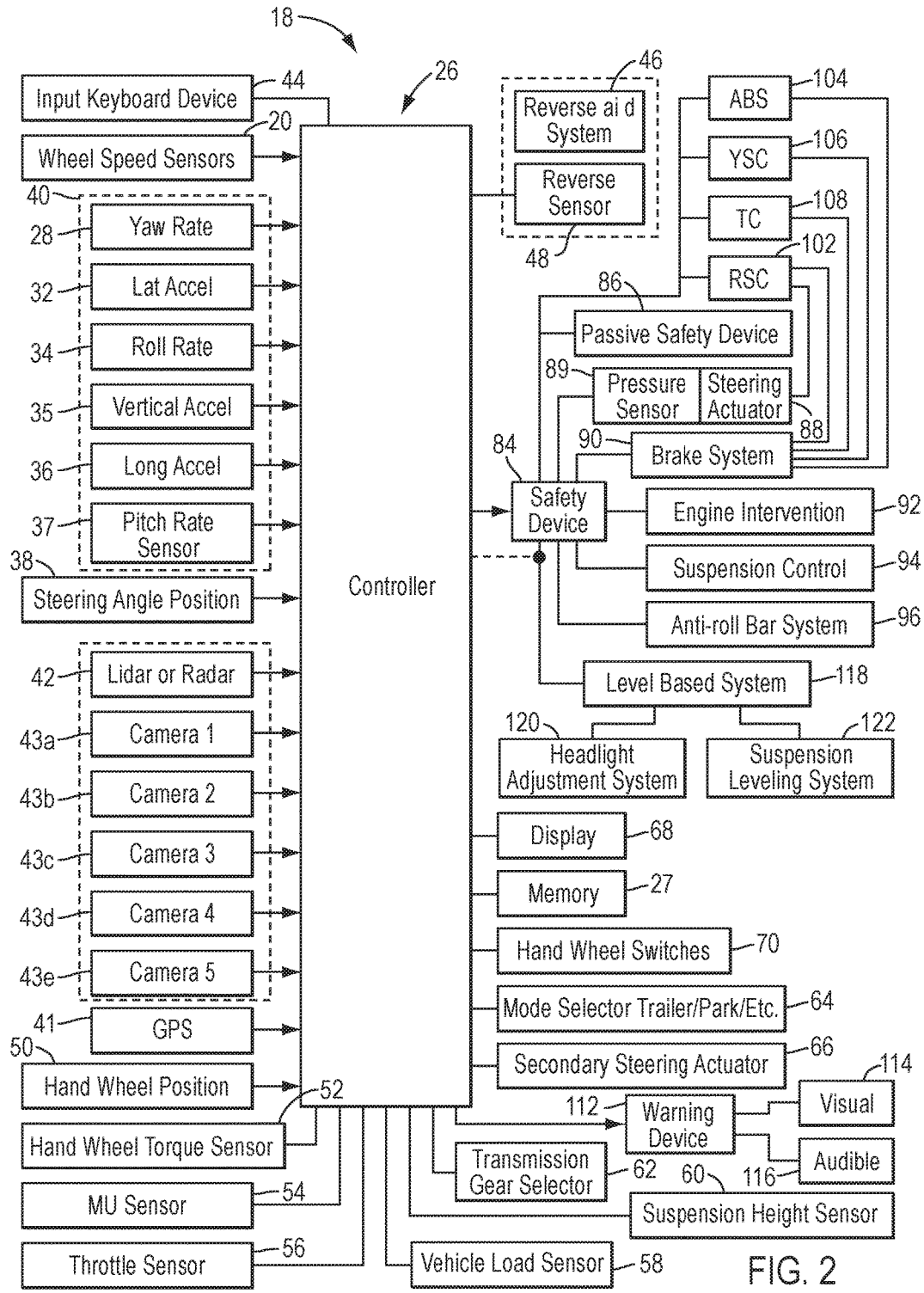
FIG. 2 is a block diagrammatic view of an exemplary control system in accordance with the present disclosure.
Figure 3:
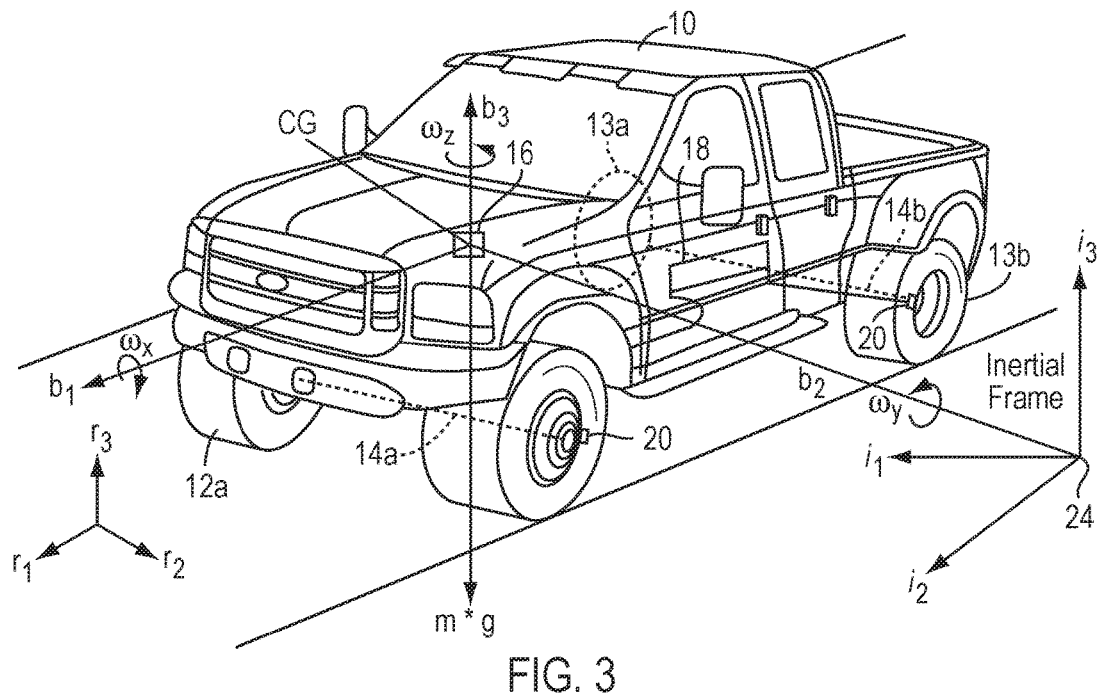
FIG. 3 is a perspective diagrammatic view of the exemplary systems of the automotive vehicle of FIG. 1.

Turning now to the drawings, FIGS. 1-3 illustrate an automotive vehicle 10 with an exemplary embodiment of a control system in accordance with the present disclosure. The disclosed control system is a collection of control systems that include, for example, powertrain controls, drivetrain controls, chassis controls, driver assist and active safety control systems. Vehicle 10 has right front (RF) and left front (LF) tires 12a and 12b and right rear (RR) and left rear (LR) tires 13a and 13b, respectively. The vehicle 10 also may include one or more of a number of different types of front steering systems 14a including, for example, a front steering system wherein each of the front wheels 12a, 12b is configured with a respective controllable actuator, and the front wheels 12a, 12b have a type of system in which both of the front wheels 12a, 12b are controlled together. The vehicle 10 may also have a rear axle system 14b.

A sensing system 16 (FIG. 3) may utilize all the sensors equipped in the control systems including but not limited to: a vehicle stability control system, suspension control system, brake control system, powertrain control system, drivetrain control system. As will be understood by those of ordinary skill in the art, the actual sensors used by the sensing system 16 may vary depending on the type of control system or systems implemented in a particular vehicle. It is contemplated that systems and methods in accordance with the present disclosure may utilize conventional sensors found in existing vehicles and/or new sensors such as, for example, vision sensors utilized for driver assistance, active safety, and autonomous driving. It also is contemplated that additional sensors may be used as needed to implement the disclosed systems and methods. Various exemplary (non-exhaustive) sensors will be further described below.

Wheel speed sensors 20 (FIG. 2) may be mounted adjacent to each wheel of the vehicle 10. Those skilled in the art will recognize, however, that different types and/or numbers of sensors may be used. For example, in various additional embodiments, three wheel speed sensors may be used instead of four. In such an embodiment, for example, one sensor may be used for the rear of the vehicle and one sensor for each of the front two wheels. The remaining sensors of the sensing system 16 may be mounted, on the vehicle body or on the chassis frame, along the reference directions x, y and z shown in FIG. 3. As those skilled in the art will recognize, the frame from b1, b2 and b3 may be called a body reference frame, whose origin is located at the center of gravity CG of the car body, with b1 corresponding to the x axis pointing forward, b2 corresponding to the y axis pointing off the left side, and b3 corresponding to the z axis pointing upward. The angular rates of the vehicle body are denoted about their respective axes as $\omega_x$ for the roll rate, $\omega_y$ for the pitch rate, and $\omega_z$ for the yaw rate. System and methods in accordance with the present disclosure may make calculations that take place in an inertial frame 24 that may be derived from the body reference frame as described below.

As will be described below, in various exemplary embodiments, the sensing system 16 may also include a lidar, radar and/or sonar sensor(s), camera(s), a GPS system and various other sensors (each of which is shown in one or more of FIGS. 1, 2 and 3).

Angular rate sensors and accelerometers may be mounted on the vehicle along the body frame directions b1, b2 and b3, which are the x, y and z axes of the vehicle 10's sprung mass.

A longitudinal acceleration sensor may be mounted on the vehicle 10 located, for example, at the center of gravity CG, with its sensing direction, for example, along the b1-axis, whose output is denoted as $a_x$. A lateral acceleration sensor may be mounted on the vehicle 10 located, for example, at the center of gravity CG, with its sensing direction, for example, along b2-axis, whose output is denoted as $a_y$. A vertical acceleration sensor may be mounted on the vehicle 10 located, for example, at the center of gravity CG, with its sensing direction, for example, along b3-axis, whose output is denoted as $a_z$.

The other reference frame used in the following discussion includes the road reference frame, as depicted in FIG. 3. The road reference frame system r1, r2, r3 is fixed on the driven road surface at any instant in travel time of the vehicle 10, where the r3 axis is along the average road normal direction computed from the normal directions of the four-tire/road contact patches.

In the following discussion, Euler angles of the body frame b1, b2, b3 with respect to the road frame r1, r2, r3 may be denoted as $\theta_{xbr}$, $\theta_{ybr}$ and $\theta_{zbr}$ which may also be called the relative Euler angles.

Referring now to FIG. 2, an exemplary control system 18 is illustrated in further detail. Control system 18 includes an exemplary controller 26. Controller 26 in this case may be a single centralized vehicle controller or a combination of individual controllers in a decentralized sense. If plural controllers are used, they may be coupled together to communicate information therebetween, and arbitration and prioritization among multiple controllers might also be performed. In one embodiment, the controller 26 is (single or plural) microprocessor-based, but practice of the present disclosure is not limited thereto.

The controller 26 may be programmed to perform various functions and control various outputs. Controller 26 may also have a memory 27 associated therewith. Memory 27 may be a stand-alone memory or may be incorporated within the controller 26. Memory 27 may store various algorithms, parameters, thresholds, patterns, tables or maps, which may be calibrated during vehicle development and/or upgradeable in the field.

The controller 26 may be used for receiving information from a number of sensors, which may include, for example, speed sensors 20, a yaw rate sensor 28, a lateral acceleration sensor 32, a roll rate sensor 34, a vertical acceleration sensor 35, a longitudinal acceleration sensor 36, a pitch rate sensor 37, and steering angle position sensor 38. Sensors 28-38 may, for example, be part of an inertial measurement unit (IMU) 40.

In one exemplary embodiment of the present disclosure, the sensors 28-37 may be located at the center of gravity of the vehicle 10. Those skilled in the art will recognize that the sensors may also be located on various locations away from the center of gravity and/or mathematically translated equivalently thereto.

The roll and pitch conditions of the vehicle 10 may be sensed by sensing the force or torque associated with the loading condition of one or more suspension or chassis components of the vehicle 10, including a pressure transducer in an active air suspension, a shock absorber sensor such as a load cell, a strain gauge, the steering system absolute or relative motor load, the steering system assist pressure, a tire lateral force sensor or sensors, a longitudinal tire force sensor, a vertical tire force sensor and/or a tire sidewall torsion sensor.

The roll and pitch condition of the vehicle 10 may also be established by one or more of the following translational or rotational positions, velocities or accelerations of the vehicle including, but not limited to: a roll gyro, the roll rate sensor 34, the yaw rate sensor 28, the lateral acceleration sensor 32, a vertical acceleration sensor 35, a vehicle longitudinal acceleration sensor 36, lateral or vertical speed sensors including a wheel-based speed sensor, a radar-based speed sensor, a sonar-based speed sensor, a laser-based speed sensor and/or an optical-based speed sensor.

Lateral acceleration, roll and pitch orientations and velocities of the vehicle 10 may be obtained using a global positioning system (GPS) 41. Of course, the GPS 41 system may be used to locate the vehicle's geographical location in real-time.

The controller 26 may also be operationally coupled to a lidar, radar, and/or sonar 42. The lidar, radar, and/or sonar 42 may be used to generate a velocity signal or a relative velocity signal of an object. The radar or lidar may also be used to generate a trajectory signal of an object. Likewise, the velocity of the vehicle 10, in various directions, may be obtained relative to a stationary object. The lidar, radar, and/or sonar sensor 42 may be mounted in various positions around the vehicle 10, including, for example, the front, sides and/or rear of the vehicle 10. Multiple sensors 42 may also be employed in multiple locations around the vehicle 10 to provide information from multiple positions of the vehicle 10. Such signals may be useful, for example, to effect a self-parking operation of the vehicle 10.

Controller 26 may also be operationally coupled to a camera system having cameras 43a-43e. A stereo pair of cameras 43a, 43b may be mounted on the front of the vehicle 10 to detect target objects in front of the vehicle 10, to measure the object size, range and relative velocity, and to classify those objects into appropriate categories. In various exemplary embodiments, the cameras 43a, 43b may detect rough road areas (e.g., pot-holes), road debris, etc. Camera 43c may be mounted on the right side of the vehicle 10, camera 43d may be mounted on the left side of the vehicle 10, and camera 43e may be directed rearward of the vehicle 10. Rear camera 43e may also include a stereo pair of cameras. All or some of the cameras may be used in a commercial embodiment. Also, the stereo pair of cameras 43a, 43b may be replaced by a single camera (43a or 43b) depending on the roll and pitch conditions measured by the system 18. The various image signals produced by the cameras may then be analyzed to determine various dynamic conditions of the vehicle.

Various types of cameras would be evident to those skilled in the art. Various embodiments of the present disclosure contemplate, for example, implementing CMOS-type cameras and/or CCD-type cameras to generate various image signals.

Controller 26 may also be operationally coupled to a passenger cabin mounted input device 44. The input device 44 may include a keyboard or other push button type devices, touch sensitive devices, or may be a voice recognition device. Input device 44 may be used to indicate to the controller a selection or other inputs.

A reverse aid sensor 48 may be, but is not limited to, an ultrasonic sensor, a radar sensor, or a combination of the two. Reverse aid sensors 48 may be located at several locations of the rear of the vehicle 10 such as in a bumper of the vehicle 10.

A hand wheel (also known as a "steering wheel") position sensor 50 may also be operationally coupled to the controller 26. The hand wheel position sensor 50 may provide controller 26 with a signal corresponding to the relative rotational position of the steering wheel within the vehicle 10. Various types of sensors include absolute sensors and position sensors using a center find algorithm (relative sensors). Relative sensors may use the center find algorithm to determine the position relative to a center position once the position is known. Both types of sensors may provide a steering angle rate signal and/or a steering direction signal. For example, the steering direction may indicate away from or toward a center position or an end stop position.

A hand wheel torque sensor 52 may also be operationally coupled to the controller 26. The hand wheel torque sensor 52 may be a sensor that is located within the steering column, for example, for direct measurement of steering torque. In this manner, the hand wheel torque sensor 52 may generate a signal corresponding to the amount of torque placed on the hand wheel (i.e., steering wheel). The steering torque may also be inferred from data available to a power steering system of the vehicle 10.

A mu ($\mu$) sensor 54 may also be operationally coupled to the controller 26. The mu sensor 54 may be a direct sensor or, more likely, is a calculated value based on available inputs. Various systems, such as, for example, a yaw control system for an anti-lock brake system (ABS) may generate mu, which is an indication of the coefficient of friction of the surface on which the vehicle 10 is traveling. The mu sensor 54 may be used to generate a coefficient of friction for the vehicle 10 or the coefficient of friction at more than one contact patch of a tire of the vehicle 10. Preferably, a respective mu is determined at each contact patch of each tire of the vehicle 10.

A throttle sensor 56 may also be operationally coupled to controller 26. The throttle sensor 56 may, for example, be a resistive sensor. Of course, other types of throttle sensors would be evident to those skilled in the art. The throttle sensor 56 generates a signal corresponding to the position of the throttle of the vehicle 10. The throttle sensor 56 may give an indication as to the driver's intention regarding acceleration. Throttle sensor may also be part of a drive-by-wire type system. A throttle type sensor may also be used in electric vehicles and vehicles with diesel engines to determine the desire acceleration. These sensors may take the form of a pedal sensor.

A vehicle load sensor 58 to sense the amount of weight or payload (e.g., passengers) within the vehicle 10 may also be operationally coupled to the controller 26. The vehicle load sensor 58 may be one of various types of sensors within the vehicle 10, including, for example, a suspension sensor. For example, one load sensor may be located at each suspension component of the vehicle 10. In various exemplary embodiments, in vehicles equipped with an air suspension, the load sensor 58 may be a pressure sensor. In various additional exemplary embodiments, the load sensor 58 may be a load cell. In any case, the vehicle load sensor 58 may generate an electrical signal corresponding to the load on the vehicle 10. One sensor or preferably one sensor for each corner of the vehicle 10 may be used. The vehicle load may, for example, be the normal load at each corner of the vehicle 10. By knowing the normal load at each corner of the vehicle 10, the total amount of loading on the vehicle 10 may be determined.

A suspension height sensor 60 may also be operationally coupled to the controller 26. The suspension height sensor 60 may comprise a suspension height sensor that is located at each corner of the vehicle 10. The suspension height sensor 60 may also be part of an air suspension or other type of active vehicle suspension. The suspension height sensor 60 generates a height signal corresponding to the extension of the suspension of the vehicle 10. The suspension height sensor 60 may also be used to determine the vehicle load, normal load, and payload distribution, rather than using vehicle load sensor 58 described above. The Suspension height sensor 60 may be one of various types of sensors including a laser, optical sensor, or the like.

A transmission gear selector 62 may also be operationally coupled to the controller 26. The transmission gear selector 62 may, for example, include a shift lever that has the PRNDL selections corresponding to the park, reverse, neutral, regular drive and low drive positions of the transmission of the vehicle 10. Also, an electrical signal may be generated in response to the position of the shift lever of a manual transmission.

A mode selector 64 may also be operationally coupled to the controller 26. The mode selector 64 may select a driver selectable mode selector such as a manually activated mechanism (e.g., push button or the like) or a voice recognition system. The mode selector 64 may, for example, select a position that corresponds to heavy load hauling. Also, the mode selector 64 may determine a park position indicating that the vehicle operator intends to park the vehicle 10. A U-turn position may also be selected via the mode selector 64. The mode selector 64 may also be used to enable or disable the system 18.

A secondary steering actuator 66 such as a turn signal actuator, an additional stalk or push buttons may also be operationally coupled to the controller 26. The secondary steering actuator 66 may also initiate the display of a turn signal indicator on the instrument panel of the vehicle 10.

A display 68 may also be operationally coupled to controller 26. The display 68 may include various types of displays or combinations of displays. The display 68 may, for example, display various conditions of the vehicle 10, such as, for example, the inputs from the input device 44, mode selector indicators from mode selector 64, and/or turn signal actuator 66. The display 68 may be a light on a dash panel or part of a more complex LED or LCD display on the instrument panel of the vehicle 10. Of course, other locations for the display may include an overhead display or the like. Such display 68 may be used, for example, to provide a "Service Required" indication to the driver, and/or to display diagnostic codes and/or other information to service personnel during servicing of the vehicle 10.

Hand wheel switches 70 may be coupled to the steering or hand wheel (not shown) of the vehicle 10. The hand wheel switches 70 may be labeled left and right corresponding to a left and right direction of the hand wheel.

In various exemplary embodiments of the present disclosure, based upon inputs from the sensors and/or cameras, GPS, and/or lidar or radar, controller 26 may also control a safety device 84. Depending on the desired sensitivity of the system 18 and various other factors, not all the sensors 20, 28-66, cameras 43a-43e, lidar or radar 42, or GPS 41 may be used in particular embodiments. The safety device 84 may be part of a vehicle subsystem control, and control a passive safety device 86, such as, for example, an airbag, a pressure sensor 89, a steering actuator 88, or a braking actuator (brake system 90) at one or more of the wheels 12a, 12b, 13a, 13b of the vehicle 10.

An engine intervention 92 may act to reduce engine power to also provide a safety function. Furthermore, other vehicle components, such as, for example, a suspension control 94 may be used to adjust the suspension of the vehicle 10 and provide for various types of control in dynamic conditions such as brake-steer. In various embodiments, an anti-roll bar system 96 may also be used to prevent rollover. The anti-roll bar system 96 may include a front or rear active anti-roll bar, or both. It should also be noted that the systems 88-96 may act alone or in various combinations. Certain systems 88-96 may also act to provide a safety function when various dynamic conditions are sensed.

The steering actuator 88 may include the position of the RF wheel actuator, the LF wheel actuator, the LR wheel actuator, and the right rear wheel actuator. As described above, two or more of the actuators may be simultaneously controlled. For example, in a rack-and-pinion system, the two wheels coupled thereto are simultaneously controlled.

Safety device 84 may also include a roll stability control system 102, an anti-lock brake system 104, a yaw stability control system 106, and/or a traction control system 108. The roll stability control system 102, anti-lock brake system 104, yaw stability control system 106, and traction control system 108 may be coupled to brake system 90. Further, these systems may also be coupled to steering actuator 88. Engine intervention 92 may also be coupled to one or more of the devices, particularly the roll stability control system, yaw stability control system, and traction control system. Thus, the steering actuator 88, brake system 90, engine intervention 92, suspension control 94, and anti-roll bar system 96 may be part of one of the dynamic control systems 102-108. The yaw stability control system 106 may have thresholds that are set by the controller 26 and that may be changed based upon the various conditions of the vehicle 10.

A warning device 112 may also be coupled to controller 26. The warning device 112 may warn of various conditions, such as, for example, a tire imbalance, vibration, impending rollover, understeer, oversteer, or an approach of an in-path object. The warnings may be provided in time for the driver to take corrective or evasive action, or as an indicator to the driver that repair at a service shop is recommended. The warning device 112 may be a visual display 114 such as warning lights or an alpha-numeric display such an LCD screen. The display 114 may be integrated with the display 68. The warning device 112 may also be an audible display 116 such as a warning buzzer, chime or bell. The warning device 112 may also be a haptic warning such as a vibrating steering wheel. Of course, a combination of audible, visual, and haptic display may be implemented as would be understood by those of ordinary skill in the art.

A level-based system 118 may also be coupled to the controller 26. The level-based system 118 may use the pitch level or angle of the vehicle 10 to adjust the system 18. Level-based system 118 may, for example, be a headlight adjustment system 120 or a suspension leveling system 122. The headlight adjustment system 120 may adjust the beam pattern downward for a loaded vehicle, and the suspension leveling system 122 may adjust the suspension at the various corners of the vehicle 10 to maintain the vehicle relatively level to the road. The level-based system 118 may also make an adjustment based on the roll angle of the vehicle 10.

Referring again to FIG. 1, exemplary vehicle 10 is illustrated in further detail. As illustrated in FIG. 1, vehicle 10 has four wheels 12a, 12b, 13a and 13b. Associated with respective wheels 12a, 12b, 13a and 13b is a pair of front brakes 130a and 130b (collectively, 130) and a pair of rear brakes 132a and 132b (collectively 132). Brakes 130 and 132 may be independently actuatable through a brake controller 134. Brake controller 134 may control the hydraulic system of the vehicle 10. Various additional embodiments of the present disclosure also contemplate using electrically actuable brakes. A suspension control 91 may be coupled to front adjustable suspension components 136a and 136b, and rear adjustable suspension components 138a and 138b. The adjustable suspension components 136a, 136b, 138a, 138b may comprise various types of components, including, for example, magnetic field responsive fluids, elastomeric component links, and/or bushing type components. In various additional embodiments, a magneto-rheological device may also be used. The suspension components 136a, 136b, 138a, 138b may be links such a toe link or other control arms of the vehicle 10. The adjustability may be incorporated into the mounting of the suspension components 136a, 136b, 138a, 138b such as in the bushings. Also illustrated in FIG. 1 is the front steering system 14a described above.

Vehicle 10 may also have an internal combustion engine 140. Engine 140 may include a throttle device 142 coupled thereto, which is actuated by a foot pedal 144. The throttle device 142 may, for example, be part of a drive-by-wire system or there may be a direct mechanical linkage between pedal 144 and the throttle device 142. Engine 140 may also include an engine controller 146. The Engine controller 146 may, for example, be an independent controller or part of the controller 26 for the vehicle 10. Engine controller 146 may be used to reduce or increase the engine power. The vehicle 10 could also be powered by a diesel engine or an electric engine, or the vehicle 10 could be a hybrid vehicle utilizing two or more types of power systems.

A transmission 148 may be coupled to the engine 140. The transmission 148 may be an automatic transmission or a manual transmission. A gear selector (not shown) may be used to select the various gears of the transmission 148. The gear selector may be a shift lever used to select park, reverse, neutral and drive positions of an automatic transmission. A transmission controller 152 may also be coupled to the transmission 148. The transmission controller 152 may be a separate component or may be integrated with the engine controller 146 or another controller such as, for example, the controller 26. Both the engine controller 146 and the transmission controller 152 may be integrated alone or together with the controller 26. As would be understood by those of ordinary skill in the art, the various controllers described above may be programmed to perform various functions.

An output of the transmission 148 is coupled to a driveline 154. The driveline 154 may be coupled to a transfer case 156 having a transfer case controller 157 and a rear differential 158. In the case of an all-wheel drive vehicle, the transfer case 156 may include a center differential (not shown). The transfer case 156 may have a 4×4 mode and a 4×2 mode that is controlled by the transfer case controller 157. The transfer case (front differential) 156 and rear differential 158 may be a closed, locking, or open differential. As would be understood by those of ordinary skill in the art, however, various types of differentials may be used depending on a desired vehicle performance and use. The differentials 156 and 158 may be controlled by the controller 26. Furthermore, the controller 26 may also know and/or control the operating conditions of the vehicle 10, including, for example, a 4×4 mode, 4×2 mode, a locking condition of each of the differentials 156 and 158, and a high and low mode for a 4×4.

With reference to FIGS. 4-9, the discussion shifts from the above exemplary vehicle platforms (as illustrated in FIGS. 1-3) to a more specific discussion concerning a more robust and capable on-board diagnostic system, which is capable of diagnosing and/or for collecting diagnostic information regarding dynamic drive-time vibrations and imbalances of drive line components of a wheeled vehicle, such as, for example, the above vehicle 10, having a control system 18 (which utilizes the controller 26) and incorporates the above platforms.

As above, it is often difficult for service personnel to accurately reproduce, diagnose, and/or repair vibrations that are identified by a vehicle's (e.g., vehicle 10) owner. Such vibrations may, for example, come from various sources, including, for example, an imbalance in the rotational components of the vehicle's chassis system (e.g., a tire and wheel assembly), from the driveline system (e.g., driveline 154), from the engine system (e.g., engine 140), or the vibrations may be external to the vehicle 10 and be caused, for example, by roadway conditions. The present disclosure, therefore, presents methods for identifying an origin of a vehicle vibration, and on-board vibration diagnostic and prognostic systems, which utilize such methods to robustly extract the vibration signatures of the vehicle 10 and record and profile the detected signatures in a time cadence to facilitate making a prognostic decision regarding the source of the vibrations.

Various embodiments of the present disclosure contemplate, for example, systems comprising a controller, such as, for example, a controller 26 that is operatively associated with a plurality of vehicle sensors that may produce signals indicative of a vibration of the vehicle 10, wherein the controller 26 is configured to determine whether or not a sensed vibration falls into a target frequency range (i.e., a target frequency band) that is indicative of a vehicle component (e.g., tire/wheel, driveline, or engine) or location. Various additional embodiments of the present disclosure contemplate that the controller 26 is further configured to test and/or confirm the initial correlation between the vehicle component or location and the sensed vehicle vibration. In this manner, as will be described further below, the controller 26 (running the diagnostic) can be used to rule out known vibration sources (i.e., faults). For example, if the conditions surrounding the vibration are not consistent with those required for a known fault (e.g., tire/wheel, driveline, or engine), that source of fault must be ruled out. This approach to eliminating (or confirming) the most common and known sources of concerns may save diagnostic time and reduce come-backs (customers returning for additional service) by directing efforts past components that have already been eliminated. And, if all available tests for known faults have been eliminated without finding the root cause, the technician can then be directed to revert to traditional diagnostic techniques to further explore a customer complaint (but without spending additional time diagnosing the already eliminated sources).

As above, the systems and methods in accordance with the present disclosure may rely on data from various systems and sensors. These systems and sensors may be conventional systems and sensors found on existing vehicles, including, for example, ABS wheel speed sensors 20; longitudinal/lateral/vertical accelerometers 36, 32, 35; a steering wheel angle sensor 38, a yaw rate sensor 28, and/or a tire pressure sensor 89. As illustrated in FIG. 2 and described above, however, the controller 26 may be operatively associated with various different types of systems and sensors that may produce various different types of signals indicative of various different types of vehicle vibrations.

As above, the term "vehicle vibration" is being used generally herein and includes the various types of vibrations that may be associated with a vehicle, including, for example, an imbalance in the rotational components of the vehicle's chassis system (e.g., a tire and wheel assembly 12a, 12b, 13a and 13b), from the driveline system (e.g., driveline 154), and from the engine system (e.g., engine 140). As would be understood by those of ordinary skill in the art, however, a single vibrating force (i.e., tire/wheel, driveline, and engine) may also generate more than one vibration. For example, an out of balance tire can develop multiple vibrations due to the distortion of the tire as it rotates (i.e., the tire is no longer round and bumps rise on the tire causing the additional vibrations). Vibration frequencies, used in the diagnostic of a rotating system, are therefore described in terms of their order. In terms of a wheel system, for example, a first order wheel vibration is a vibration with a frequency that corresponds to once per revolution of a wheel, a second order wheel vibration is a vibration with a frequency that corresponds to two vibrations per revolution of the wheel, and a third order wheel vibration is a vibration that corresponds to three vibrations per revolution of the wheel. Similarly, in terms of a driveline system, a first order driveline vibration is a vibration with a frequency that corresponds to once per revolution of the driveline, a second order driveline vibration is a vibration with a frequency that corresponds to two vibrations per revolution of the driveline, and a third order driveline vibration is a vibration that corresponds to three vibrations per revolution of the driveline. And, in terms of an engine system, a first order engine vibration is a vibration with a frequency that corresponds to once per revolution of the engine, a second order engine vibration is a vibration with a frequency that corresponds to two vibrations per revolution of the engine, and a third order engine vibration is a vibration that corresponds to three vibrations per revolution of the engine.

Accordingly, as used herein, the term "first order vehicle vibration" refers to a vibration with a frequency that corresponds to once per revolution of a respective rotating vehicle component. The term "second order vehicle vibration" refers to a vibration with a frequency that corresponds to two vibrations per revolution of the rotating vehicle component. And, the term "third order wheel vibration" refers to a vibration that corresponds to three vibrations per revolution of the rotating vehicle component.

As would be further understood by those of ordinary skill in the art, the systems and methods described herein may generally be applied to various rotating vehicle components, including driveline and/or engine diagnostics, and are not limited in any manner to tire and wheel assemblies. As wheel diagnostics are the most common application, for clarity purposes, the disclosed systems and methods will generally be described with reference to wheel diagnostics below. Accordingly, unless otherwise indicated, any descriptions in this document to a general nth order vehicle vibration or a nth level vehicle vibration are intended to indicate a nth order wheel vibration.

In accordance with various embodiments, after receiving signals indicative of a vehicle vibration, the controller 26 may determine a magnitude of the sensed vehicle vibration at one or more target frequency bands. In accordance with various embodiments, for example, the controller 26 is configured to determine a frequency range associated with the signals (indicative of vehicle vibration) through processing the sensor measurements using real-time Fast Fourier Transform or spectrum analysis, as would be understood by those of ordinary skill in the art.

The controller 26 may then determine whether or not the vehicle vibration is associated with one or more wheels 12a, 12b, 13a and 13b of the vehicle 10 based on the magnitude of the vehicle vibration at the one or more target frequency bands. As would be understood by those of ordinary skill in the art, the target frequency bands are determined by the physics of the system, the component (i.e., tire/wheel, driveline, or engine), the material characteristics of the vehicle's components (e.g., spring rates and tire stiffness), and other engineered-in properties that must be established for each system being diagnosed. Accordingly, the target frequency bands are pre-calculated via model based calculation (i.e., a vehicle dynamics model), frequency based calculation, and/or statistics based calculation.

In the case of wheel diagnostics, the rotation of the wheel may generate an excitation, which creates a resonance of the natural frequency of the wheel that produces a strong vibration signal. A first-order wheel vibration, for example, will excite this natural frequency when the rotational velocity of the wheel matches the natural frequency of the tire-hop subsystem. This natural frequency can be pre-calculated from a vehicle dynamics model, and is, for example, generally in a range of about 10 Hz to about 15 Hz. Therefore, if the vibration occurs at a velocity where the wheel speed matches the 10-15 Hz frequency, it is indicative of a first-order problem with that wheel. A second order vibration in the wheel is still exciting the same natural frequency of the tire-hop subsystem, but is doing so with two vibrations per revolution of the wheel instead of one. Therefore, the vibration will occur at half the rotational velocity of the wheel, compared with a first-order wheel problem. If the vibration signature is observed at this half-wheel-velocity, it is therefore indicative of a second order problem with the wheel instead of a first order problem.

Accordingly, a target frequency band indicative of a first order wheel vibration would be about 10 Hz to about 15 Hz. And, a target frequency band indicative of a second order wheel vibration would be about 20 Hz to about 30 Hz. In various additional embodiments, for example, one of the target frequency bands may be indicative of a second order drivetrain vibration, which reflects a pre-calculated drivetrain imbalance vibration calculated from a drivetrain dynamics model.

In various further embodiments, a wheel problem may also be directly observed by one of the sensors. For example, the ABS wheel speed sensor 20 may directly observe rotational variations in the tooth timings. Such indications would largely be visible and consistent across speed ranges, and would not be confined to any specific frequency range. Such direct indications, however, are much smaller signals and are more difficult to detect than looking for the resonance where the rotation excites the natural frequency of the component.

Accordingly, the controller 26 may determine that the indicated (sensed) vehicle vibration is associated with one or more wheels 12a, 12b, 13a and 13b of the vehicle 10 if the sensed vehicle vibration falls within one of the pre-calculated frequency bands that are indicative of a wheel vibration (i.e., a first or second order wheel vibration). Furthermore, as described below with reference to FIG. 11, the wheel rotational velocity must also be consistent with the appropriate first or second order frequency. If one or more of the parameters are out of range, the controller 26 may determine that the source of the sensed vibration is not one of the wheels 12a, 12b, 13a and 13b, and a wheel vibration/imbalance issue can be ruled out.

As discussed further below, if the controller 26, however, determines that the source of the sensed vibration is one of the wheels 12a, 12b, 13a and 13b, the location of the vibration can then be determined by looking at the patterns of the vibration signals coming from the four wheels 12a, 12b, 13a and 13b. The errant wheel causing the vibration will have the strongest signal, and cross-coupling of vibrations through the chassis tend to occur in recognizable patterns. Coupling, for example, occurs to some extent across the same axle, and across the same side of the vehicle 10, while diagonal coupling is typically much less significant. Coupled signals, however, are generally much weaker in magnitude than the primary signal, and can thus be differentiated from the primary signal. Thus, for single-fault instances, the wheel that is the source of the vibration can often be determined readily from the individual signal frequency component magnitudes.

In this manner, the controller 26 can generate a diagnostic recommendation based on whether or not the vehicle vibration is associated with the one or more wheels 12a, 12b, 13a and 13b. For example, generating a first diagnostic recommendation when the vehicle vibration is associated with the one or more wheels 12a, 12b, 13a and 13b and generating a second diagnostic recommendation when the vehicle vibration is not associated with the one or more wheels 12a, 12b, 13a and 13b.

Figure 4:
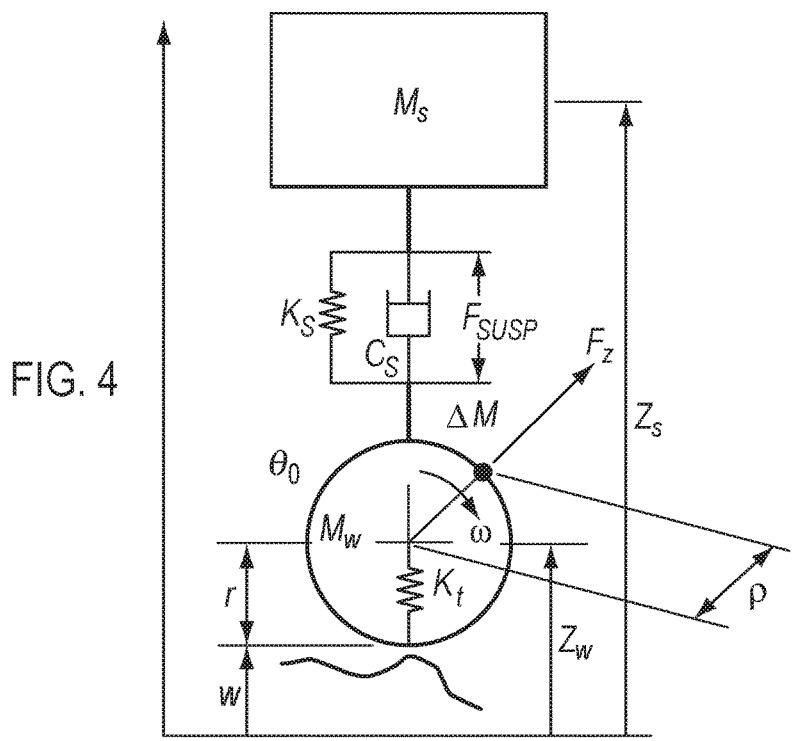
FIG. 4 is a diagram illustrating wheel hop due to a centripetal force caused by an imbalance mass.

FIG. 4, for example, shows a diagram illustrating wheel hop that is due to a centripetal force caused by an imbalance mass (e.g., a static imbalance due to a weight imbalance existent on a wheel, such as, for example, 12a, 12b, 13a, 13b) with a given distance to a rotation center (i.e., a rotation center of the wheel 12a, 12b, 13a, 13b). Such an imbalance may, for example, generate a forced vibration in a vertical direction of the wheel hop, which is incurred during actual driving of the vehicle. Such imbalances can be produced, for example, by the loss of balance weight (i.e., having fallen off); loss of rim weight (i.e., due to scraping against a curb); and/or water, ice and/or snow collection on or within the wheel.

Exemplary formulas concerning such wheel hop are shown below. In particular, the centripetal force Fz may be calculated using the following equations:

$$M_s \ddot{z}_s = -K_s z_{sh} - C_s \dot{z}_{sh} + F_{susp} \qquad (1)$$

$$M_w \ddot{z}_w = K_s z_{sh} + C_s \dot{z}_{sh} - F_{susp} - K_t z_{td} - C_t \dot{z}_{td} + F_z \qquad (2)$$

$$F_z = M_w \alpha^T \begin{bmatrix} \omega^2 \sin\Omega + \dot{\omega}\cos\Omega \\ \omega^2 \cos\Omega - \dot{\omega}\sin\Omega \end{bmatrix} \qquad (3)$$

$$\Omega = \int_0^t \omega(\tau)d\tau \qquad (4)$$

$$\alpha_1 = \frac{\Delta M}{M_w}\rho\cos\theta_0 \qquad (5)$$

Figure 11:
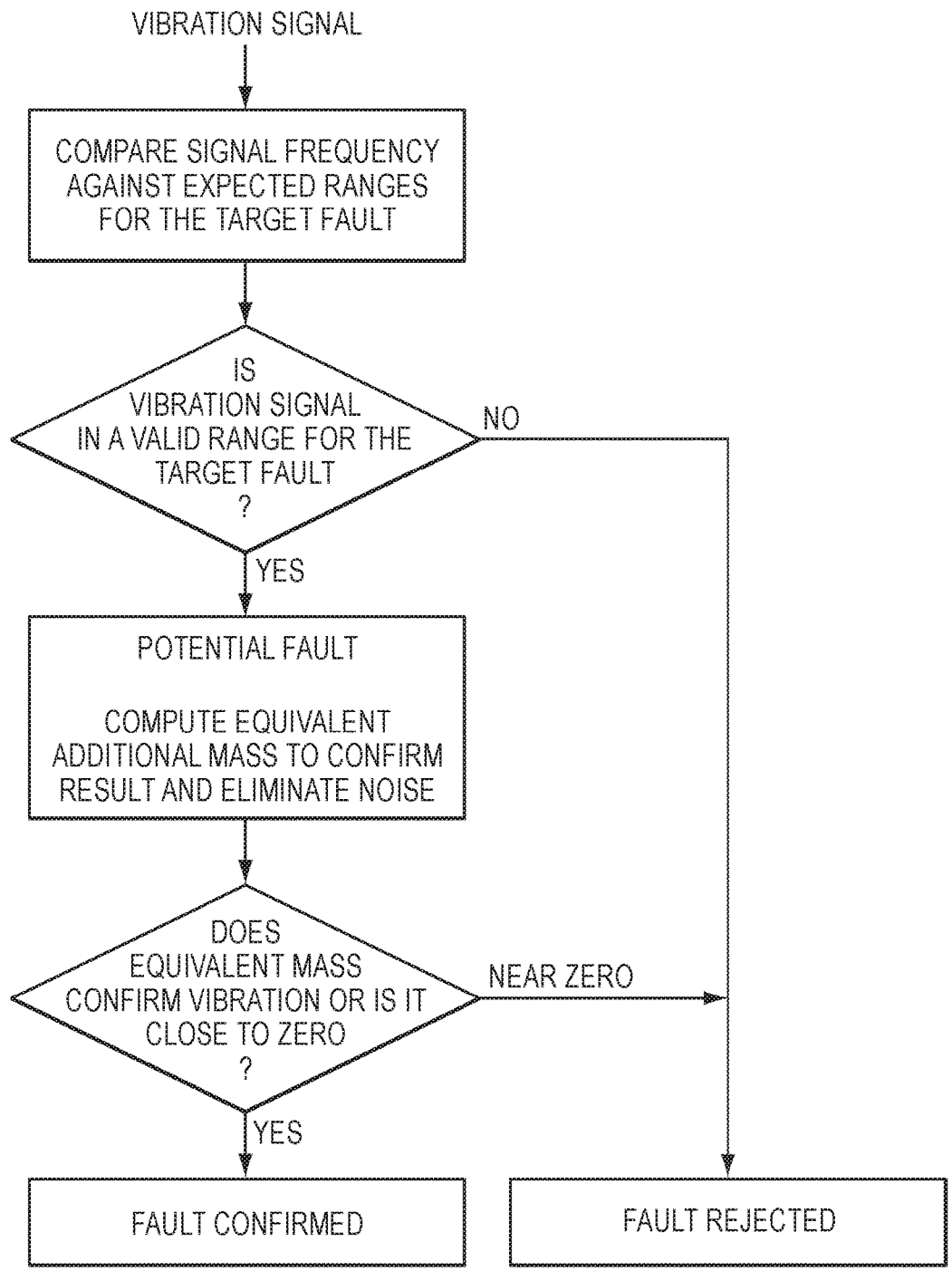
FIG. 11 is a flow chart illustrating an exemplary process for identifying and confirming a vehicle vibration in accordance with the present disclosure.

Within such equations: $z_s$ denotes a body vertical displacement, $z_w$ a wheel vertical displacement, w a vertical road profile, $F_{susp}$ a suspension force if a controllable suspension is used ($F_{susp}=0$ if the suspension is passive), $M_s$ a sprung mass, $M_w$ an unsprung mass, $K_s$ a passive suspension stiffness, $C_s$ a passive suspension damping, $K_t$ a tire vertical stiffness, and $C_t$ a tire vertical damping. FIG. 11, for example, demonstrates how the above equations can be used to improve the robustness of the disclosed algorithm. As illustrated in FIG. 11, the vibration signature (i.e., vibration signal) is first checked against the expected frequency ranges of a target fault (i.e., a target frequency band indicative of a vehicle vibration) to determine whether the vibration could potentially be an indication of the target fault. If this $1^{st}$ check indicates that the magnitude of the vibration signals suggests the target fault, the above equation (5) may then be used to compute the equivalent additional mass ΔM (i.e., the equivalent mass to produce the vibration) due to, for example, tire imbalance. As indicated in the above equation, ΔM may be estimated through a from the vehicle's motion signals, such as, for example, wheel speed. If ΔM is determined to be close to zero, the vibration signals are determined to be due to signal noise. If, however, ΔM is determined to be greater than a threshold value, such as, for example, 100 g, the vibration signals are determined to be due to a real physical source and not merely due to signal noise, thereby confirming the suspected fault. Hence this 2-step detection helps to confirm the fault indication, or dispute it as noise, thus improving the detection robustness.

Figure 5A:
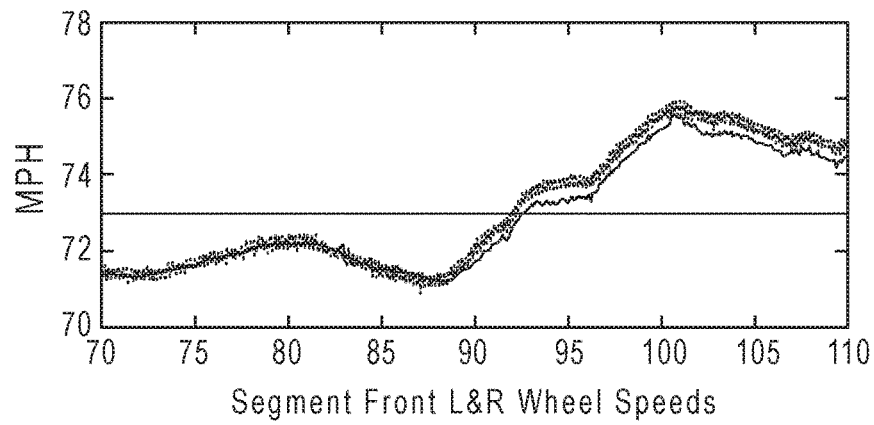
FIGS. 5A-5F (collectively FIG. 5) show examples of wheel vibration experienced by the four wheels of a vehicle due to a single wheel imbalance and identified in accordance with the present disclosure.
Figure 5B:
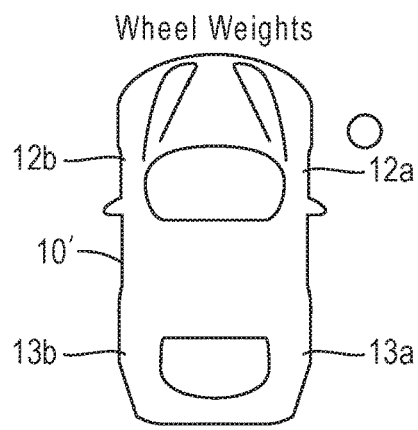
Figure 5C:
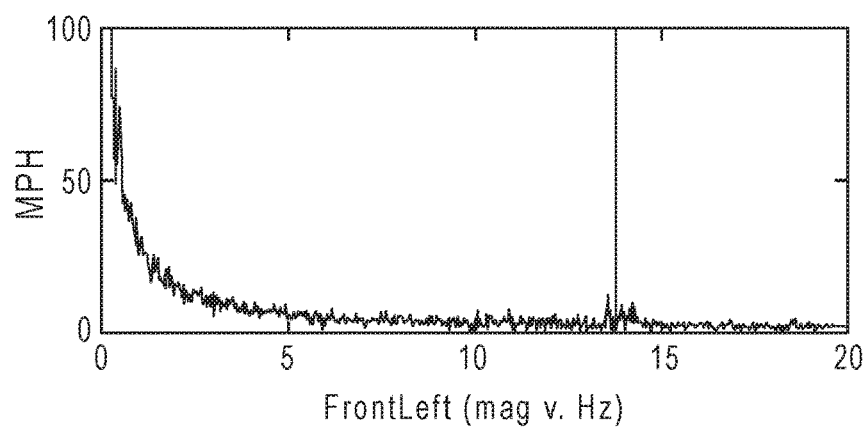

With reference to FIG. 5B, an exemplary vehicle 10' is shown. Similar to the above vehicle 10, vehicle 10' has RF and LF tires 12a and 12b and RR and LR tires 13a and 13b, respectively, with the RF tire 12a being afflicted with an exemplary significant weight imbalance (e.g., a 145 gram weight balance) that is illustrated symbolically by a dot "●" marked adjacent to the RF tire 12a. FIG. 5A illustrates an exemplary plot of the vehicle's 10' travel speed, and FIGS. 5C-5F illustrate the normalized magnitude of the vibrations experienced by the vehicle 10' computed through calculation of the absolute value of the band-filtered vibration signals for the FL, FR, RL, RR tire/wheel assemblies of the vehicle 10' having the weight imbalance illustrated in FIG. 5B.

Figure 6:
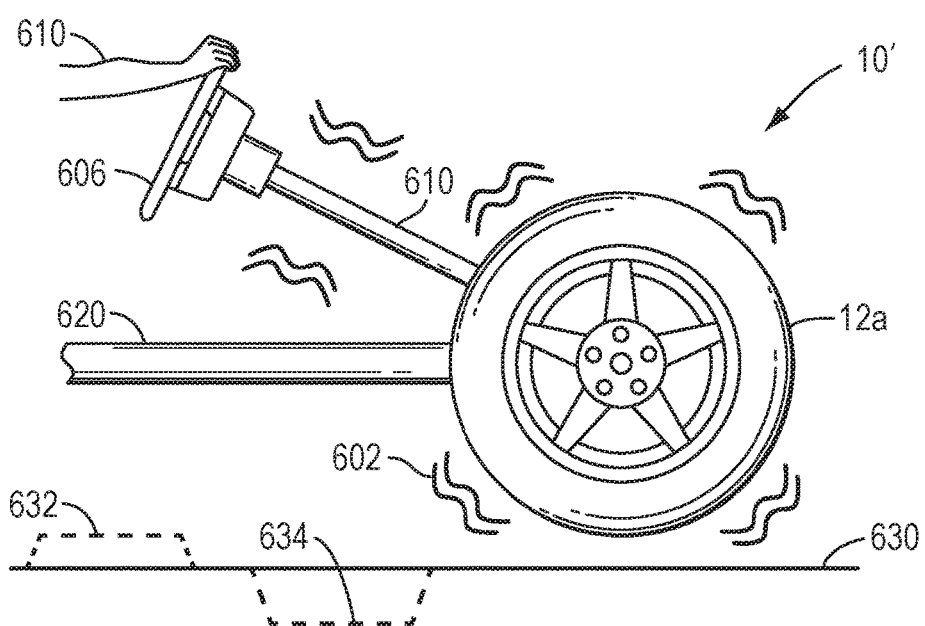
FIG. 6 is a side view of an exemplary wheel and steering arrangement, illustrating vibrations that may result due to various road features.

As shown in FIG. 6, the imbalanced RF tire 12a may begin to exhibit a noticeable vibration 602 when the vehicle 10' drives with operating conditions (e.g., a given rotational speed) which allow the RF tire 12a to resonate. The vibration 602 may travel up a steering column 610 to a steering wheel 606, and may be felt by a driver 610 grasping the steering wheel 606. The vibration 602 may also travel along or across a frame 620 or axle (not shown) of the vehicle 10' and be felt by the driver 610 in other ways (e.g., through a seat (not shown)), or the vibration 602 may induce vibration in the other (e.g., neighboring or adjacent) wheels 12b, 13a, 13b.

Figure 5D:
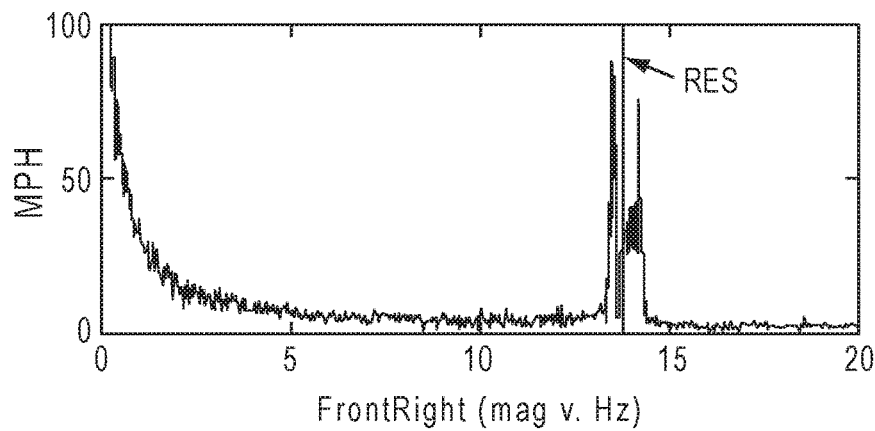
Figure 5E:
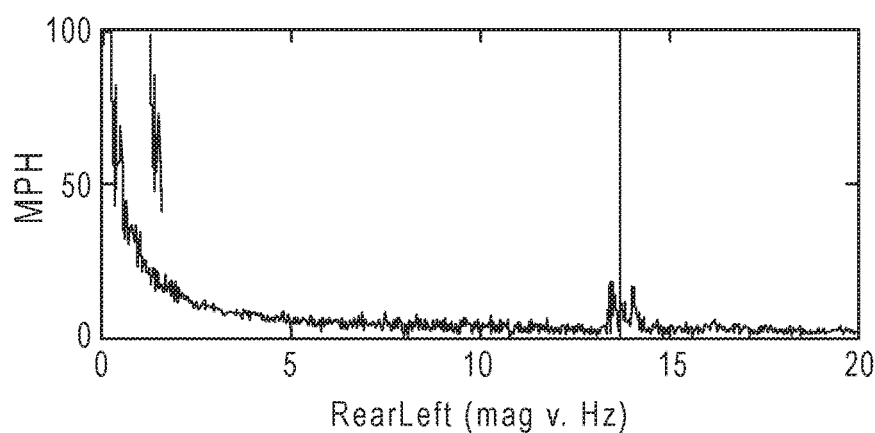
Figure 5F:
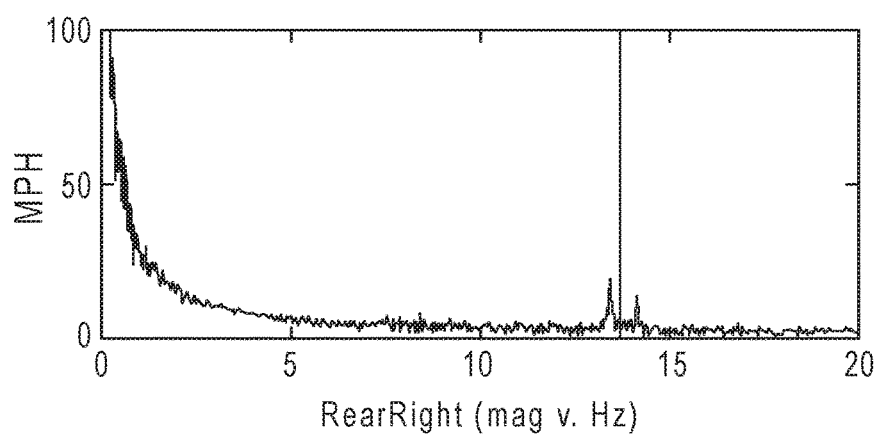

FIGS. 5C-5F, for example, are graphs illustrating the magnitude of vibration verses frequency (Hz), for each of the LF and RF tires 12b and 12a and LR and RR tires 13b and 13a, respectively. As shown by FIG. 5D, the imbalanced RF tire 12a experiences especially high magnitudes of vibration at a resonant point (shown symbolically by vertical resonance line RES) close to or at when the vehicle 10' drives with resonant operating conditions. As shown by FIGS. 5E and 5F, the LR tire 13b and RR tire 13a may also experience significant induced (sympathetic) vibrations (e.g., by cross-talk from the imbalanced RF tire 12a through or across the vehicle's frame or axle), while LF tire 12b experiences a lesser induced vibration.

As above, in a vehicle equipped with a conventional on-board diagnostic system, which looks at the sensors (e.g., accelerometers and/or wheel speed) of each wheel separately, the system would perform an on-board diagnosis of each wheel separately (i.e., a separate diagnosis for each of the LR and RR wheels) and set a diagnostic flag indicating that each such wheel experienced a vibration. This would then cause a service shop to perform unnecessary balancing of the tires 12b, 13a, 13b, instead of just balancing the imbalanced RF tire 12a.

As described above, diagnostic systems in accordance with the present disclosure may, however, avoid such unnecessary balancing. For example, with reference to FIG. 7, an exemplary method for collecting diagnostic information regarding dynamic drive-time vibrations and imbalances of drive line components of a wheeled vehicle, such as, for example, vehicle 10, 10', in accordance with the present disclosure is illustrated. Such a method (as one example) may be used by on-board diagnostic systems in accordance with the present disclosure to monitor any of the previously-mentioned, or other differing types of, on-board signals of the wheeled vehicle in real-time regarding plural drive line components and plural operational conditions, during a drive-time of the wheeled vehicle. As illustrated, for example, the method may monitor various on-board signals such as: wheel speeds; longitudinal acceleration; latitudinal acceleration; vertical acceleration; yaw rate; roll rate; electric power assisted steering (EPAS) signals; rough road signals; wheel speed; mileage/distance; tire pressure monitory system (TPMS) info.

Figure 7:
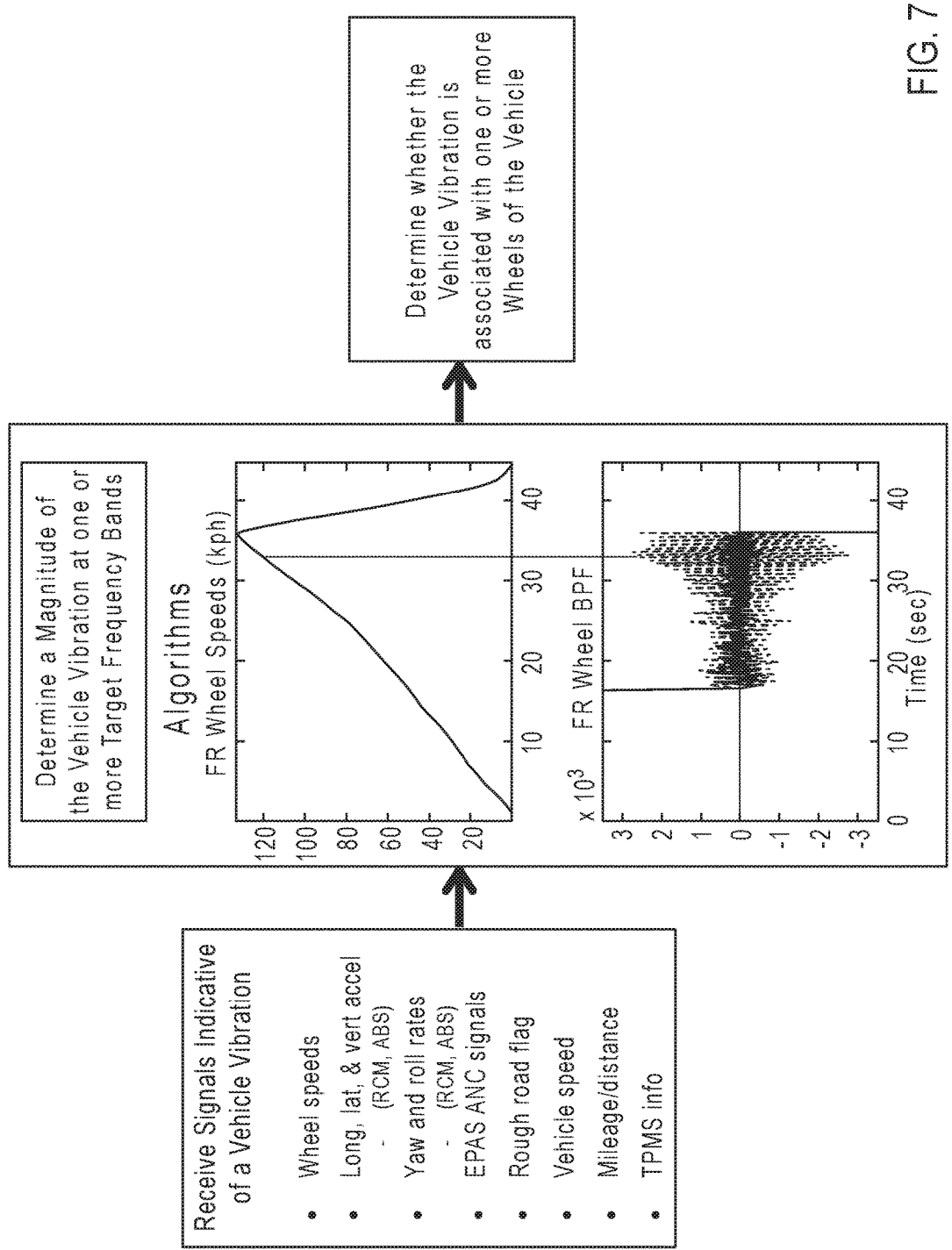
FIG. 7 is a combination flow and plot diagram showing an exemplary process flow in accordance with the present disclosure.

As further shown in FIG. 7, such a method may then apply one or more predetermined algorithms, in real-time, during the drive-time of the wheeled vehicle, to consider plural ones of the differing types of on-board signals and regarding plural drive line components and plural operational conditions, to detect a real-time vibration of a tire and/or drive line component of the wheeled vehicle. For example, in accordance with various exemplary embodiments, systems and methods in accordance with the present disclosure may utilize a band-pass filter (BPF) as shown in a lower central portion of FIG. 7 to pass a band of frequencies determined to be associated with vibrations and imbalances of the wheels of the subject vehicle of interest. For wheel diagnostics, one example of a suitable BPF may be to pass frequencies within a range of about 7 to about 15 Hz, or a range of about 10 Hz to about 15 Hz. As would be understood by those of ordinary skill in the art, a BPF, as used herein, transmits signal content within a desired frequency range (i.e., band) through to its output, but blocks the signal contents outside the frequency band from the output signal. Thus, if any signal magnitude remains in the output, it is considered to be within the frequency band of interest.

Figure 9:
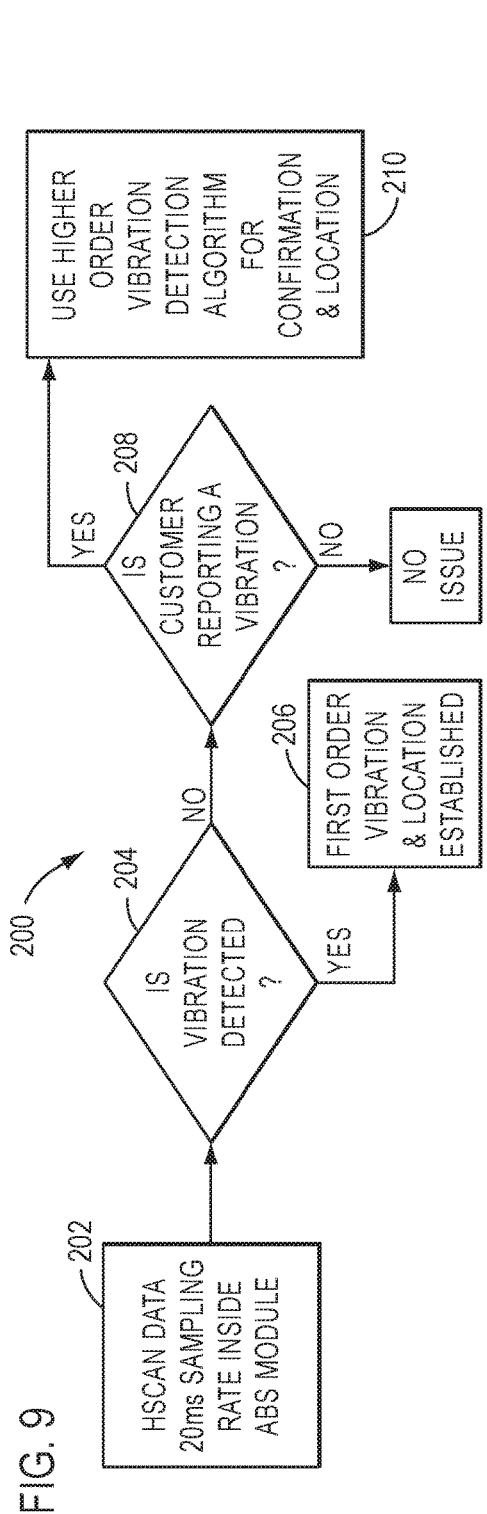
FIGS. 9 and 10 are flow charts illustrating exemplary processes for identifying first order and/or second order vibrations in accordance with the present disclosure.
Figure 10:
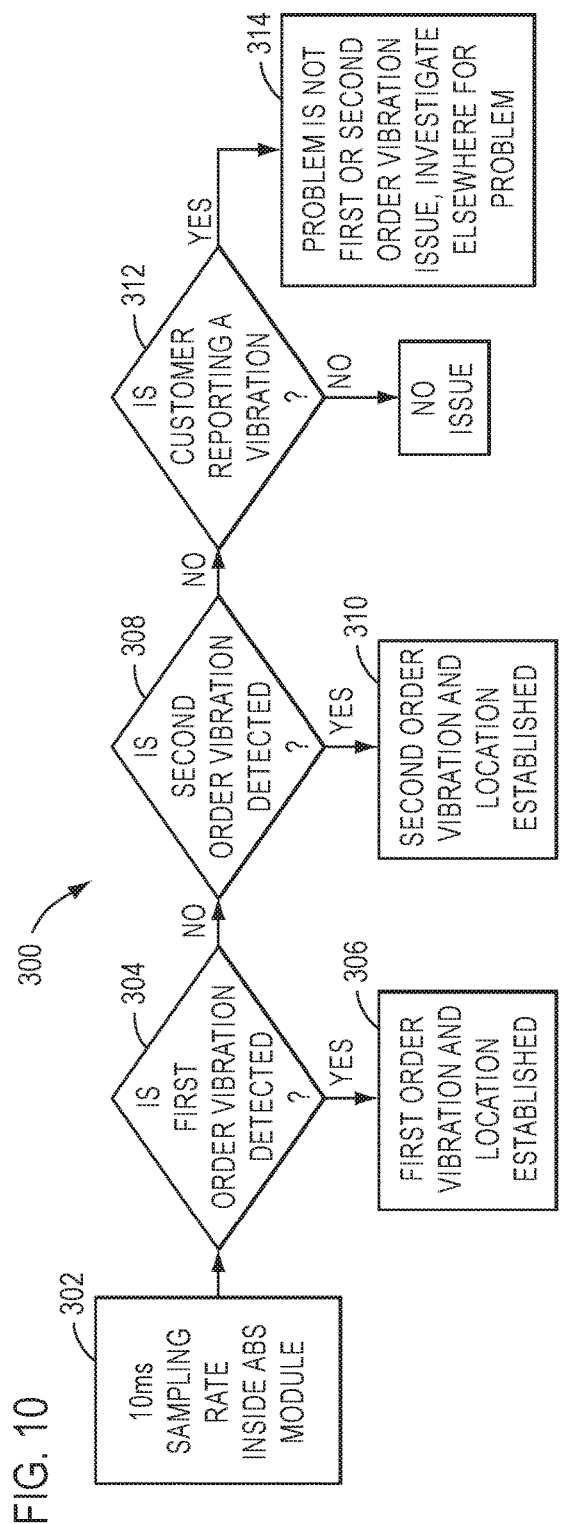

The disclosed systems and methods may, for example, allow vehicle service providers to utilize process flows as illustrated in FIGS. 9 and 10 to differentiate between different types of vibrations. FIG. 9 shows an exemplary decision making process 200 (as used by a service provider) that utilizes the disclosed methods for identifying a tire/wheel vibration or a drive-train vibration. As illustrated in steps 202 and 204 of FIG. 9, based on high speed CAN signals (H/S CAN) with 20 second sampling rates, a first order vibration algorithm (i.e., that is run by the vehicle's diagnostics system) may or may not detect a vibration as described below.

The strongest vibration signature of the rotating component being diagnosed, a wheel in this example, occurs when the rotational frequency of the component excites the natural frequency of the component subsystem. In this wheel example, the component subsystem is comprised of the wheel and tire, suspension, and other parts that comprise the unsprung mass of the vehicle. As above, the natural frequency of this subsystem is determined by the physics of the system, in this case being a function of the mass, spring rates, damping, tire flex, etc. An unbalanced wheel, for example, will excite the signal the most when the wheel has a rotational velocity that aligns its first order (once-per-rotation) vibration with the natural frequency of the system, thereby amplifying the signal. Since these frequencies are known (i.e., they are pre-calculated as described above), if the rotational velocity corresponds to the natural frequency when the vibration is detected most strongly, a first order wheel problem is indicated. As described above, with reference to FIG. 11, this indication may be further confirmed by additional testing.

If a first order vibration is detected during some of the driving conditions and recorded in the ECU (e.g. controller 26) of the diagnostics system, at step 206, the location of the vibration may be further determined based on: (1) how many wheels are showing a vibration signal with a large magnitude, and (2) an interrelationship of all the wheels with noticeable vibration signals. In this manner, the diagnostics system checks for and provides an indication of a vibration that was detected and, to the extent possible, its source location.

If a first order vibration is not detected by the diagnostics system, at step 208, the service provider may check a customer report to determine if the customer still reported a vibration. In other words, if no recognizable vibration is identified by the diagnostics system, but the customer is complaining of a vibration, the service provider may deduce that the reported problem is not from one of the known/tested sources and may follow procedures to identify the cause of the complaint from some other source. For example, if the customer reported a vibration, at step 210, it may be determined that the vibration may have a higher order and a higher order vibration algorithm, such as, for example, a second order vibration algorithm, may be utilized to confirm the location and type of vibration detected. The controller 26, for example, may or may not implement a higher order detection algorithm automatically, depending, for example, on how that mode applies to the component in question, the likelihood of that order problem (e.g., problems greater than second order are generally unlikely), customer desire, etc.

If implemented, a second order vibration algorithm would work exactly as the first order vibration algorithm, except to account for the difference in rotational frequency of the component. As above, a wheel with a second order vibration produces that vibration at twice the frequency of the rotation of the wheel. Thus excitation of the natural frequency of the subsystem would occur at half the wheel rotational velocity of the first order excitation. By checking for a vibration at this wheel velocity, a second order indication could be made. This process could continue on to additional vibration orders as well, but there are diminishing returns as these orders have little or no correspondence with real-world failure modes. If, however, after reaching step 210, a problem has not been identified, the process is no longer automatic, and the service provider would need to use traditional troubleshooting techniques to search for a problem, aided by the elimination of the more common causes tested by the system.

FIG. 10, for example, shows a similar decision making process 300 that automatically implements a second order vibration algorithm (i.e., that is run by the vehicle's diagnostic system). Similarly in FIG. 10, at steps 302 and 304, a first order vibration algorithm may or may not detect a first order vibration based on on-board sensor measurements at a 10 ms sampling rate. At step 306, if the first order algorithm detects a first order vibration during some of the driving conditions and records the vibration in the ECU (e.g., controller 26) of the diagnostics system, the location of the vibration may be further determined based how many wheels show a vibration signal with a large magnitude and the interrelationship all the wheels with noticeable vibration signals. If a first order vibration is not detected, at step 308, a second order algorithm may be used, and may or may not detect a second order vibration. At step 310, if the second order algorithm detects a second order vibration, then the location of the vibration may be further determined based on how many wheels show a vibration signal with a large magnitude and the interrelationship all the wheels with noticeable vibration signals. If a second order vibration is not detected, at step 312, the service provider may check the customer report to verify that a vibration had indeed occurred. That is, if there is a verified vibration, but the problem is not a first or second order wheel issue, then further investigation is required to determine the source of the problem, and the driver and/or service provider may be notified to this regard via a notification system associated with the diagnostics system.

Although FIG. 10 essentially details the same process as FIG. 9, except that it demonstrates the use of a second order test in addition to a first order test (where such a test is applicable and desired) the input sampling rate has changed in order to adequately support the two tests. While a second order wheel vibration will excite the natural frequency at a lower rotational velocity than the first order, there may be some direct effects visible in the sensor signal, and other diagnostic problems may have similar characteristics. Adequate oversampling may therefore be required, per the Nyquist theorem, in order to detect the desired effect in the measured signal. In such cases, it may therefore be necessary to increase the available sampling rate of the input signals in order to implement such a higher-order detection filter, as indicated in the exemplary process flow of FIG. 10.

As above, in accordance with various further embodiments, systems and methods in accordance with the present disclosure may utilize algorithms that may determine a vibration of a particular wheel of a vehicle, and which also take into consideration the real-time vibrations of the other wheels. For example, in returning to the illustrated FIGS. 5A-5E, an algorithm determining a vibration of a LR wheel (FIG. 5E), may take into consideration (e.g., compare) the real-time vibrations of the RF wheel (FIG. 5D), and determine that the smaller vibration experienced by the LR wheel is only a cross-talk vibration emanating from the RF wheel. Such algorithms may, for example, look at signal magnitudes, which will be different depending on if the vibration is form cross-talk or a directly measured vibration. Those of ordinary skill in the art would understand, however, that the relative magnitudes of the signals would have to be tuned for specific vehicle platforms.

FIGS. 8A-8D, for example, illustrate experimental data comparing vibrations experienced by each of four wheels (shown by using four lines of varying characteristics), having respective experimental weight imbalances (listed on each respective figure) that were purposefully added to (e.g., a front left (FL)) one of the wheels. As shown in FIG. 8D (illustrating a 145 gram weight imbalance) and FIG. 8C (illustrating a 105 gram weight imbalance) in comparison to FIG. 8A (illustrating a 0 gram weight imbalance) and FIG. 8B (illustrating a 55 gram weight imbalance), the greater the weight imbalance of one particular (weight-imbalanced) wheel in comparison to the another (e.g., single) wheel or other (all remaining) wheels, the greater the magnitude of vibration exhibited by that weight-imbalanced wheel.

Accordingly, in an induced vibration situation such as FIG. 5E (which shows a relatively small vibration magnitude relative to FIG. 5D), the algorithm will not flag any diagnostic codes with respect to the LR wheel, and in fact, may not even save historical data with respect to the LR wheel's vibration. In other words, since the absolute magnitude of the vibration signal for the LR wheel is below a given threshold and its relative magnitude in comparison to the FR wheel's relative magnitude is also below a given threshold, the algorithm does not detect a vibration for the LR wheel, and no data is stored for the LR wheel. In this manner, systems and methods of the present disclosure may determine that the induced vibration for the LR wheel is irrelevant and that the LR wheel does not need service, thereby disregarding the LR wheel vibration episode and preventing unnecessary balancing of the LR wheel.

Still further, systems and methods in accordance with the present disclosure may utilize algorithms that take into account frequencies or a band of frequencies that are determined to be associated with vibrations and imbalances of other (non-wheel) components of the subject vehicle of interest. For example, a drive shaft, constant velocity (CV) joint(s), transmission, engine, etc., may exhibit frequencies or a band of frequencies differing from the band of frequencies determined to be associated with vibrations and imbalances of the wheels of the subject vehicle of interest. The other frequencies may, for example, be multiples of the first order vibration frequency (i.e., second order, third order, etc. vibration frequencies).

In short, if a frequency is encountered during any vibration episode, which is a wheel frequency, then the on-board diagnostic algorithm may focus on the wheel(s) as a potential source of the vibration. In contrast, if a frequency is encountered during any vibration episode, which is a non-wheel frequency, then the on-board diagnostic algorithm may focus on other components as a potential source of the vibration.

Systems and methods of the present disclosure may also take various other types of on-board signals into consideration, to detect which drive line component (e.g., which wheel; which CV joint; which drive shaft section) experienced a real-time vibration. For example, signals from acceleration sensors mounted at multiple locations (e.g., four quadrants) of the car body may be also be used within the algorithm to better diagnose (i.e., pinpoint) which component (e.g., which wheel) is the source of the real-time vibration. In such instances, the algorithm may flag a confirmed vibration diagnostic code (e.g., indicative of an imbalance, and co-relating the non-wheel suspect drive line component's name (e.g., drive shaft or code) into the vehicle's historical on-board diagnostic (OBD) record. Such would allow a service shop to ignore the wheels as the source of vibration, and instead concentrate service efforts on the non-wheel suspect component.

The disclosed systems and methods may also compile a history (e.g., a table) of occurrences experienced during the drive-time of the wheeled vehicle by storing, for each vibration episode or occurrence detected, i.e., for each vibration episode, compile vibration information stored in association with an identifier of the drive line component and with at least select ones of the differing types of the on-board signals regarding plural operational conditions of the wheeled vehicle. For example, for a given vibration episode, the systems and methods may store and co-relate various information such as: date; time; global positioning system (GPS) location coordinates; vehicle travelling speed; wheel speed; steering angle; component (e.g., wheel) temperature; environmental (i.e., outside) temperature, tire pressure sensor outputs, suspension height sensor outputs, etc.

The disclosed algorithms may be further designed or programmed not to flag each and every vibration as requiring service. Such is advantageous in ignoring (i.e., sifting or parsing out) transient or non-reoccurring vibrations. As one example, systems in accordance with the present disclosure (running such algorithms) may monitor the history of occurrences, during the drive-time of the wheeled vehicle, to detect a subject drive line component having a predetermined plurality of repeated occurrences of vibration, with equivalent at least select ones of the differing types of the on-board signals regarding plural operational conditions of the wheeled vehicle. Then, the systems may flag the subject drive line component having a predetermined plurality of repeated occurrences of vibration, as a suspect drive line component afflicted with dynamic drive-time vibrations and imbalances.

As one example, if there are a first plural (e.g., predetermined) number of occurrences of the RF wheel experiencing a vibration consistently occurring at a certain traveling speed (e.g., at X miles-per-hour (MPH) or kilometers-per-hour (Km H)), then the algorithm may flag a pending vibration diagnostic code (e.g., indicative of a RF tire imbalance, and co-relating the suspect speed) into the vehicle's historical on-board diagnostic (OBD) record. Further, if subsequent additional episodes occur and the vehicle eventually reaches a second plural (e.g., predetermined) number of occurrences of the RF wheel experiencing a vibration consistently occurring at the certain traveling speed (e.g., X miles-per-hour (MPH) or kilometers-per-hour (KmH)), then the algorithm may flag a confirmed diagnostic code into the vehicle's historical OBD record.

A more sophisticated algorithm in accordance with the present disclosure may even use additional information to avoid flagging a confirmed diagnostic code in certain situations. As one (rough road considering) example, if the vehicle has experienced a predetermined number of vibrations consistently occurring at a 60 MPH traveling speed, but only at a certain geographical GPS road location, the algorithm may be designed or programmed to assume that the reoccurring vibration is attributable to a rough road section, rather than the vehicle itself, i.e., as examples, the vibration may be attributable to a speed-bump like road bump 632 (FIG. 6) or pothole 634 (FIG. 6) at the GPS road location. In such instances, the algorithm may flag a confirmed vibration diagnostic code (e.g., indicative of a rough road imbalance, and co-relating the suspect GPS coordinates) into the vehicle's historical on-board diagnostic (OBD) record.

Further, another (rough road considering) exemplary algorithm may take vibration instances of pairs of wheels into consideration (e.g., via comparison of wheel information). More particularly, as a first example, if both the LF and RF wheels experience a vibration episode at approximately the same time, the algorithm may be designed or programmed to assume that the reoccurring vibration is attributable to speed-bump like road bump 632, rather than the vehicle itself. In such instance, the algorithm may flag a confirmed vibration diagnostic code (e.g., indicative of a speed-bump like rough road vibration, and co-relating the suspect GPS coordinates) into the vehicle's historical on-board diagnostic (OBD) record. As a second example, if both the RF and RR wheels (which travel approximately along the same travel path along a road) experience a vibration episode one-after-the-other, the algorithm may be designed or programmed to assume that the reoccurring vibration is attributable to a pot-hole like road bump 634, rather than the vehicle itself. In such instance, the algorithm may flag a confirmed vibration diagnostic code (e.g., indicative of a pot-hole like rough road vibration, and co-relating the suspect GPS coordinates) into the vehicle's historical on-board diagnostic (OBD) record.

A more sophisticated algorithm of the present disclosure may even use additional information to include warranty-negating information together with flagging a confirmed diagnostic code in certain situations. As one (collision considering) example, the algorithm may also monitor (e.g., via the acceleration sensors) and keep track of collisions of the vehicle, which register higher than a predetermined degree (e.g., force). Then, if the vehicle subsequently experiences a predetermined number of vibrations consistently occurring immediately following a particular collision (e.g., such as the vehicle's wheels hitting a pot-hole 634 or curb with a particular force), the algorithm may be designed or programmed to assume that the reoccurring vibration is attributable to the collision, rather than fault of the vehicle itself. In such instance, the algorithm may flag a confirmed vibration diagnostic code (e.g., indicative of a wheel imbalance, and co-relating the date, time, GPS coordinates and the acceleration sensor signals from the suspect collision) into the vehicle's historical on-board diagnostic (OBD) record. Based upon such warranty-negating information, the service shop (e.g., dealership) would be armed with information to explain non-warranty coverage to the vehicle owner if needed.

As another (temperature considering) example, if the vehicle has experience a predetermined number of RF wheel vibrations consistently occurring at various traveling speeds but only when the wheel temperature and environmental (i.e., outside) temperature are below freezing, then the algorithm may be designed or programmed to assume that the low-temperature-reoccurring vibration is attributable to frozen water existing within the tire. In such instance, the algorithm may flag a confirmed vibration diagnostic code (e.g., indicative of a temperature-related vibration, and co-relating various wheel and environmental (i.e., outside) temperatures) into the vehicle's historical on-board diagnostic (OBD) record.

Advantages or benefits of the present disclosure are, therefore, a more robust on-board dynamic drive-line vibration diagnostic aid (i.e., tool) which is able to: pinpoint wheel and chassis problem sources more accurately; reduce a number of service return visits; reduce warranty costs (which presently represents a vehicles (VEs) number two (2) issue).

While the present teachings have been disclosed in terms of exemplary embodiments in order to facilitate a better understanding, it should be appreciated that the present teachings can be embodied in various ways without departing from the scope thereof. Therefore, the present teachings should be understood to include all possible embodiments which can be embodied without departing from the scope of the present disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the devices and methods of the present disclosure without departing from the scope of its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A method for identifying a source of a vibration in a vehicle, comprising:
   receiving signals indicative of the vibration from one or more sensors operatively associated with the vehicle while the vehicle is in operation;
   determining a magnitude of the vibration based on the signals at one or more target frequency bands;
   determining whether the vibration is an internal, vehicle-based vibration is originating from one or more wheels of the vehicle based on the magnitude of the vibration at the one or more target frequency bands; and
   generating a first diagnostic recommendation when the vibration is determined to be an internal, vehicle-based vibration and generating a second diagnostic recommendation when the vibration is determined to be an external-based vibration not originating from the one or more wheels.

2. The method of claim 1, wherein one of the target frequency bands is determined by a natural wheel hop frequency of the one or more wheels.

3. The method of claim 2, wherein a first order wheel target rotational velocity is calculated such that a wheel rotational frequency coincides with a natural wheel hop frequency band.

4. The method of claim 3, wherein a second order wheel target rotational velocity is calculated such that twice the wheel rotational frequency coincides with the natural wheel hop frequency band.

5. The method of claim 1, wherein one of the target frequency bands is determined by an expected first or second order vibration frequency caused by drivetrain imbalance.

6. A method for identifying a source of a vibration in a vehicle, comprising:
   receiving signals indicative of the vibration from one or more sensors operatively associated with the vehicle while the vehicle is in operation;
   based on the signals determining whether the vibration is a transitory issue due to a condition external to the vehicle or is a repetitive issue due to a condition within the vehicle; and
   generating a diagnostic recommendation when the vibration is determined to be a repetitive issue.

7. The method of claim 6, wherein determining whether the vibration is a transitory issue that originated from a condition external to the vehicle comprises determining whether the vibration is due to road conditions or ambient temperature.

8. The method of claim 6, wherein determining whether the vibration is a repetitive issue that originated from a condition within the vehicle comprises determining whether the vibration is due to a condition of a tire/wheel, driveline, and/or engine of the vehicle.

9. A method for identifying a source of a vibration in a vehicle, comprising:
   receiving signals indicative of the vibration from one or more sensors operatively associated with the vehicle while the vehicle is in operation;
   processing the signals to determine if a first order vibration is present;
   if the first order vibration is determined to be present, generating a first diagnostic recommendation to resolve the first order vibration;
   if the first order vibration is determined to not be present, processing the signals to determine if a second order vibration is present;
   if the second order vibration is determined to be present, generating a second diagnostic recommendation to resolve the second order vibration; and
   if the second order vibration is determined to not be present, generating a third diagnostic recommendation to consider issues unrelated to the first and second order vibrations.

10. The method of claim 9, wherein determining if the first order vibration is present includes comparing a frequency of the signals to a target natural frequency band indicative of the first order vibration.

11. The method of claim 9, wherein determining if the second order vibration is present includes comparing a frequency of the signals to a target natural frequency band and confirming that a rotational frequency of a vehicle component is indicative of the second order vibration.

12. The method of claim 9, wherein determining if the first order vibration is present includes determining if a first order wheel vibration, a first order driveline vibration, or a first order engine vibration is present.

13. The method of claim 12, wherein determining if the first order wheel vibration, the first order driveline vibration, or the first order engine vibration is present includes comparing a frequency of the signals to a target frequency band indicative of the first order wheel vibration, a target frequency band indicative of the first order driveline vibration, or a target frequency band indicative of the first order engine vibration, respectively.

14. The method of claim 9, wherein determining if a second order vibration is present includes determining if a second order wheel vibration, a second order driveline vibration, or a second order engine vibration is present.

15. The method of claim 14, wherein determining if the second order wheel vibration, the second order driveline vibration, or the second order engine vibration is present includes comparing a frequency of the signals to a target frequency band indicative of a natural frequency of wheel vibration and a wheel rotational frequency to half the natural frequency of wheel vibration, a target frequency band indicative of a natural frequency of driveline vibration and a driveline rotational frequency to half the natural frequency of driveline vibration, or a target frequency band indicative of a natural frequency of engine vibration and an engine rotational frequency to half the natural frequency of engine vibration, respectively.

16. The method of claim 9, further comprising determining an origin of the first order vibration.

17. The method of claim 16, wherein determining if the first order vibration is present comprises determining if a first order wheel vibration is present, and wherein determining the origin of the first order vibration comprises determining the origin of the first order wheel vibration by examining a signal magnitude from each wheel of the vehicle.

18. A system for identifying a source of a vibration in a vehicle, comprising:
a controller operatively associated with a plurality of sensors of the vehicle, wherein the controller is configured to:
identify sensor feedback indicative of a vibration;
based on the feedback, determine a frequency range associated with the vibration; and
based on the frequency range, make an initial determination as to whether the vibration originated within the vehicle, from a component of the vehicle or a location on the vehicle, or whether the vibration originated from a source external to the vehicle.

19. The system of claim 18, wherein the sensor feedback indicative of the vibration includes at least one of wheel speeds, engine speed, transmission input shaft speed, transmission output shaft speed, longitudinal acceleration, lateral acceleration, and vertical acceleration.

20. The system of claim 18, wherein the controller is configured to determine the frequency range through processing sensor measurements using real-time Fast Fourier Transform and/or spectrum analysis.

21. The system of claim 18, wherein the controller is further configured to test and/or confirm the initial determination.

22. The system of claim 21, wherein the controller is configured to determine whether the vibration originated from a source external to the vehicle.

23. The system of claim 21, wherein the controller is configured to distinguish between tire imbalance and drivetrain vibration.

24. The system of claim 18, wherein the controller is configured to extract a vibration signature based on at least one of a model-based calculation, a frequency-based calculation, and a statistics-based calculation.

25. The system of claim 18, wherein the controller is configured to detect a tire/wheel vibration.

26. The system of claim 25, wherein the controller is configured to identify a tire/wheel location most likely to be a source of the tire/wheel vibration.

27. The system of claim 25, wherein the controller is configured to identify whether a vibration in each tire/wheel is due to tire imbalance or cross-talk.

28. The system of claim 18, wherein the controller is further configured to provide a diagnostic instruction or recommendation based on the initial determination.

29. The system of claim 28, wherein the controller is configured to provide the diagnostic instruction or recommendation to a user and/or service provider of the vehicle.

\* \* \* \* \*